United States Patent [19]

Gurr et al.

[11] 4,348,668
[45] Sep. 7, 1982

[54] SYSTEM FOR CONTROLLING POWER DISTRIBUTION TO CUSTOMER LOADS

[75] Inventors: George P. Gurr, Dunwoody; Bruce J. Nelson, Lilburn, both of Ga.

[73] Assignee: Sangamo Weston, Inc., Atlanta, Ga.

[21] Appl. No.: 53,710

[22] Filed: Jul. 2, 1979

[51] Int. Cl.³ .................... H04Q 9/00; G01R 21/00; H02J 4/00
[52] U.S. Cl. ................ 340/825.06; 364/493; 307/39
[58] Field of Search ........... 340/147 R, 147 P, 310 R, 340/310 A, 825.06; 364/492, 493; 307/39

[56] References Cited

U.S. PATENT DOCUMENTS

| | | | |
|---|---|---|---|
| 4,023,043 | 5/1977 | Stevenson | 364/493 |
| 4,064,485 | 12/1977 | Leyde | 340/147 R |
| 4,167,786 | 9/1979 | Miller et al. | 364/493 |
| 4,173,754 | 11/1979 | Feiker | 340/310 R |
| 4,180,744 | 12/1979 | Helwig, Jr. | 340/147 R |
| 4,264,960 | 4/1981 | Gurr | 364/493 |

Primary Examiner—Donald J. Yusko
Attorney, Agent, or Firm—Saidman & Sterne

[57] ABSTRACT

A method and apparatus which permits a power utility to have direct control of customers loads (CD) with a view toward facilitating enablement of a load management philosophy which includes peak shaving and load deferral. A master control station (MCS), which comprises a programmable microprocessor-based central controller, is in two-way communication with a plurality of substation injection units (SIU), one of each of which is positioned at a separate substation of the power utility. Each substation injection unit (SIU), under the control of its own microprocessor, responds to master control signals from the master control station (MCS) to inject a pulse code signal onto the power lines of the utility. The system includes a plurality of remote receiver units (RRU) which are positioned at and connected to control the on and off times of customer loads (CD). Each remote receiver unit (RRU) is preset to respond to particular pulse code signals from the substation injection units (SIU) to carry out the desired command functions, which can be implemented either automatically or manually on a fixed or dynamic-cycle basis as the need arises. The system utilizes a command signal and pulse code signal verification technique to insure system integrity and reliability.

5 Claims, 18 Drawing Figures

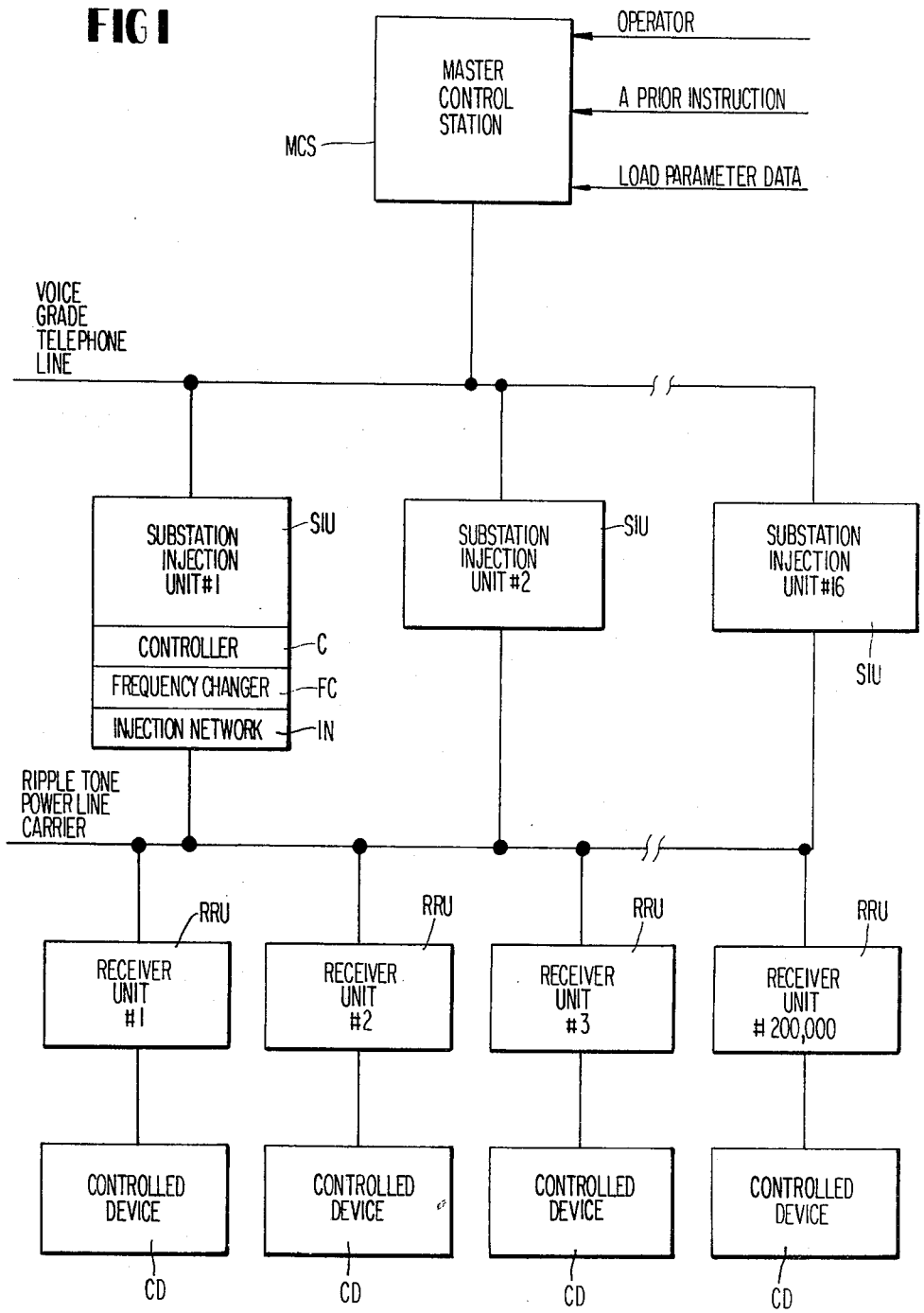

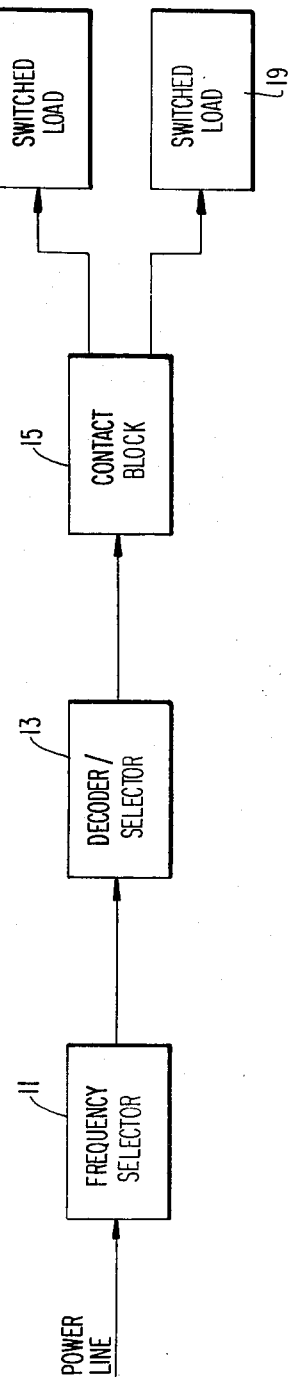

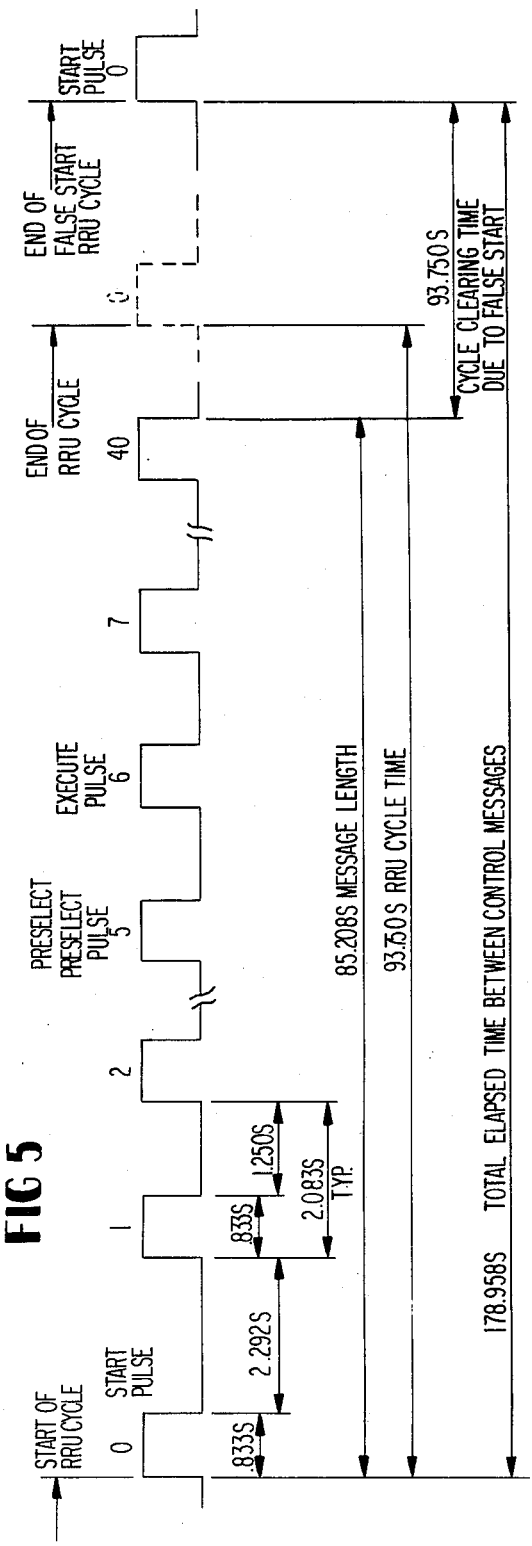
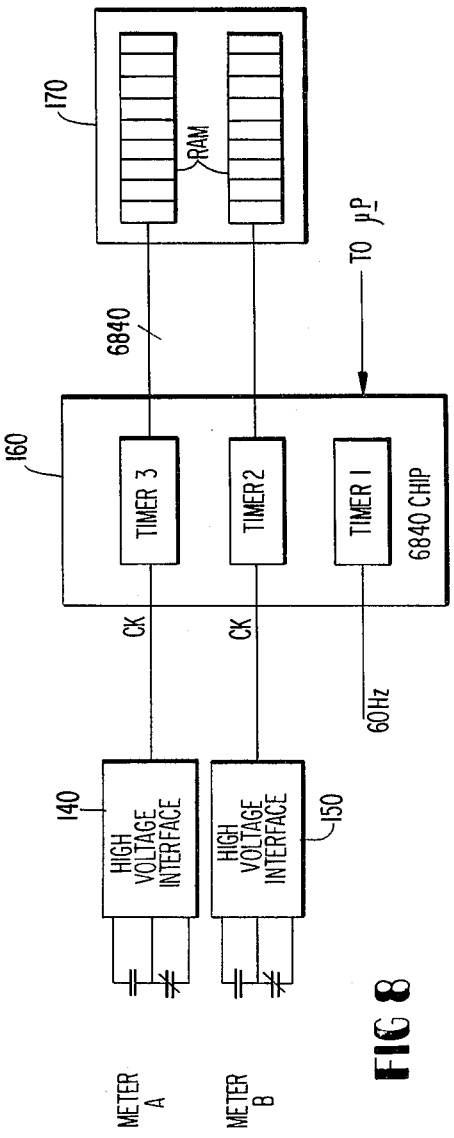

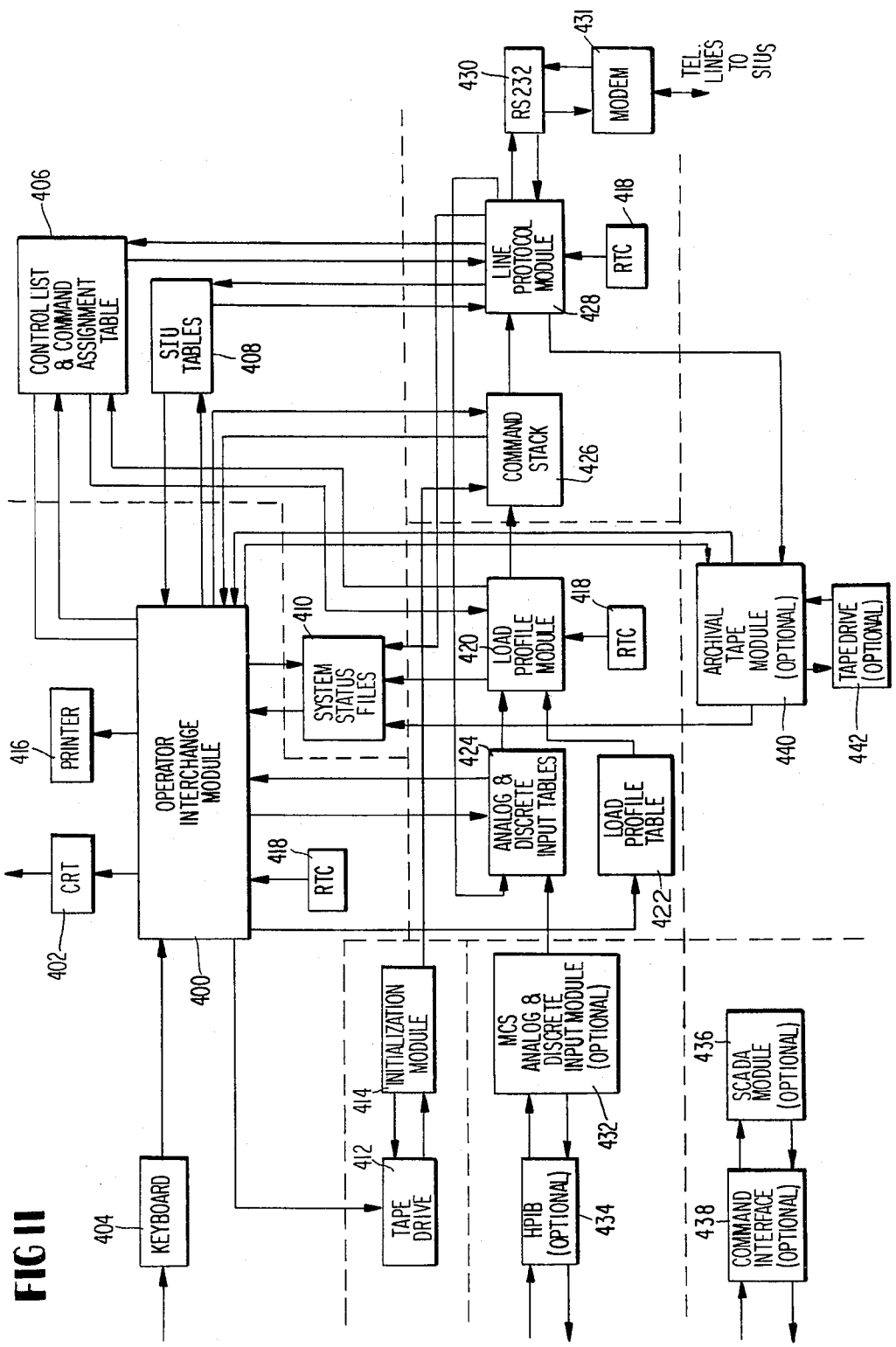

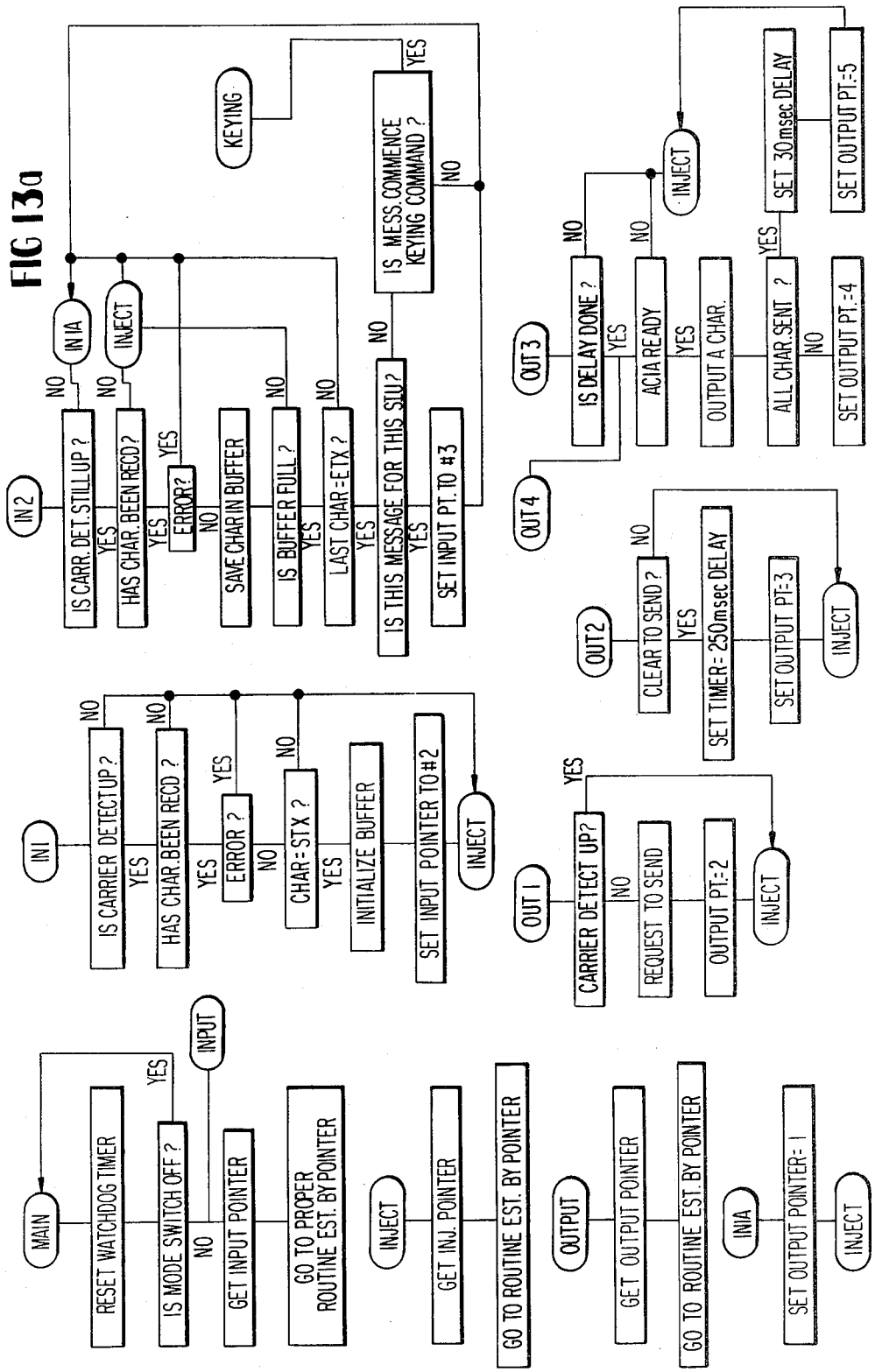

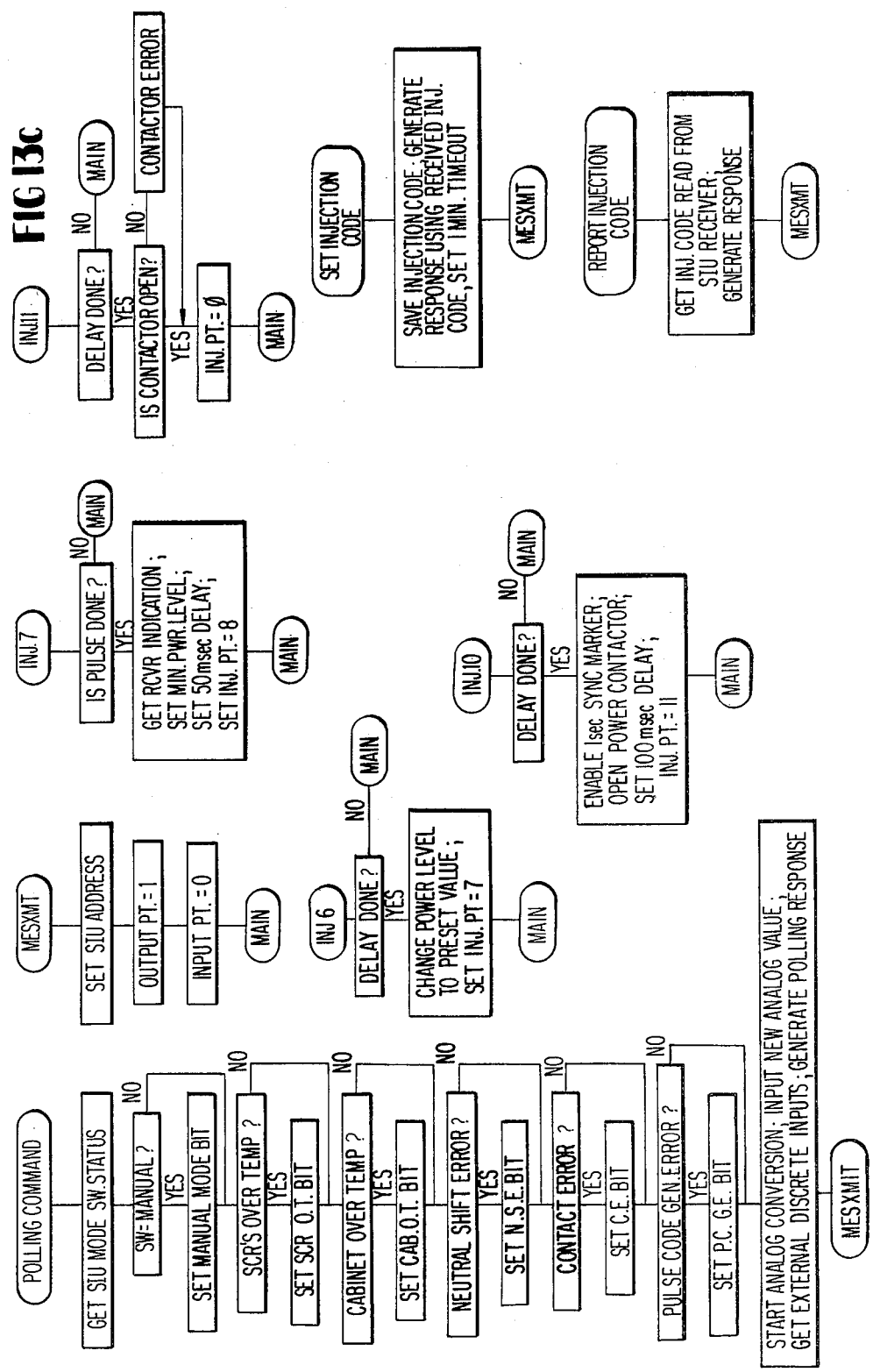

SYSTEM FOR CONTROLLING POWER DISTRIBUTION TO CUSTOMER LOADS

BACKGROUND OF THE INVENTION

1. Field Of The Invention

The present invention is related to load management and control for power utilities and, more particularly, is directed to a method and apparatus for permitting an electric utility to selectively control distribution of its power to a plurality of customer loads.

2. Description Of The Prior Art

Most electrical power utilities in the United States must construct their power generating plants with sufficient capacity to meet the total customer power demand at any given point in time. This means that although maximum or peak power demands may occur only relatively infrequently, when compared with the average power demand, the utility must nevertheless have the power generating capacity to meet the peak demand. Many utilities therefore either pay for or charge their customers in accordance with peak power demands rather than average or actual power consumed. If the peak power demand periods can therefore be minimized or controlled, savings to the customer and utility will be effected.

The foregoing situation has lead to the development of load management systems for use by electric power utilities which permit them to control peak demands on the power generating equipment by turning off and on various customer loads during various times. Various types of customer loads which can be regulated in this manner to control and minimize peak power demand include, for example, electric hot water heaters, air conditioning compressors, electric space heaters, and the like.

One type of load management control technique is known as the ripple tone injection method. In such a system, audio frequency pulses are coded by control function and are impressed directly onto the utility's power lines. Receivers located at the customer loads respond to the coded pulses to effect the desired command function.

It is known to provide electromechanical ripple control transmitters, consisting of a motor/alternator set operating through thyristor static switches, to apply the pulse coding to the power lines. It has also recently been proposed to utilize static frequency converters, consisting of a static inverter and suitable coupling network, for a ripple control transmitter. See, for example, "Pulse Coded Inverter For Utility Load Management System", Galloway and Berman, IAS 1977 Annual, pages 149 through 155.

Known United States Patents which relate to power load management include: U.S. Pat. Nos. 3,359,551; 3,886,332; 3,972,470; 4,064,485; 4,075,699; and 4,130,874.

In U.S. Pat. No. 3,359,551, for example, a system is disclosed for controlling the operation of a power distribution network in which signals are transmitted over power lines to a plurality of receivers which perform electrical circuit connections and disconnections in response to the received signals. In this system, the signals contain address and command information so that one of a plurality of receivers are selected in response to the address portion and a predetermined function is performed in response to the command portion. The transmitter at a selected location employs derivatives of these signals to produce predetermined sequences of relatively high frequency carrier bursts to be fed to the power lines for distribution to tuned receivers at the other end of the line.

In U.S. Pat. No. 4,075,699, a power monitoring and load shedding system is described which includes power consumption metering for entering overall power consumption into a central processing unit. Circuitry is provided for the central processing unit to turn local and remote loads on and off in accordance with stored energy consumption projecting and load shedding algorithms.

While each of the prior art systems appear useful in a given context, a practical, centralized load management control system for electric utilities must be cost effective in order that the savings resulting from load management outweighs the cost to the utility and the consumer of the load management system. It is toward achieving this broad objective that the present invention is advanced.

OBJECTS OF THE INVENTION

It is therefore a primary object of the present invention to provide a load management system for electric power utilities which is cost effective, reliable, easy to operate and maintain, and is modular in construction so as to be adaptable for controlling a wide range of customer loads.

Another object of the present invention is to provide a method and apparatus for permitting an electric power utility to directly or indirectly control customer loads, either automatically or manually, in accordance with pre-established control commands which may be varied or updated as the utility deems necessary.

A further object of the present invention is to provide a load management system for electric power utilities which utilizes a central control that provides an emergency load shedding control capability that allows the utility to maintain essential customer loads while dropping less essential loads for brief time periods to maintain system integrity.

A further object of the present invention is to provide an electric power utility with the capability of load management at minimum cost by utilizing proven components combined in a novel manner to provide the central operator of the system with updated status and alarm information concerning any of the substation units in order that corrective action can be taken.

A still further object of the present invention is to provide a load management system for electric power utilities which utilizes standard telephone line data links between the master station and the substation units, and the power distribution lines as a communication link between the substation units and the load-controlling receivers.

An additional object of the present invention is to provide a load management system for electric power utilities which permits system parameters to be fed back to the master control station from the substations to provide instantaneous updating of operating parameters which can be taken into account in load management decisions.

A still further object of the present invention is to provide a method of managing customer loads which incorporates reliability checks and communications integrity to insure proper operation.

SUMMARY OF THE INVENTION

The foregoing and other objects of the invention are attained in accordance with one aspect of the present invention through the provision of a system for permitting an electric power utility to control the distribution of its power along its power lines from a substation to a plurality of customer loads, which comprises a master control station including first programmable digital data processor means and input/output devices under the control of an operator for generating master control signals, at least one substation injection unit located at the substation and in communication with the master control station and operating under the control of second programmable digital data processor means for injecting in response to certain of the master control signals pulse code signals onto the power lines, and a plurality of remote receiver units each connected to a particular load device and to the power lines for receiving the pulse code signals, each of the remote receiver units responsive to one of the pulse code signals for connecting or disconnecting its load from the power lines.

The substation injection unit more particularly comprises means for converting the frequency of a standard three-phase power line voltage signal generated at the substation to a preselected frequency desired for the pulse code signals, means responsive to the second data processor means for controlling the output of the frequency converting means to generate said pulse code signals, and means for injecting the pulse code signals onto the power lines for transmission to the remote receiver units.

In accordance with more specific aspects of the present invention, the frequency converting means comprises three-phase rectifier means including a plurality of conduction controlled solid state devices under the control of the second data processor means for receiving the three-phase power line voltage signal and for developing a DC voltage signal of a predetermined level, and three-phase inverter means including a plurality of conduction controlled solid state devices also under the control of the second data processor means for receiving the DC voltage signal from the rectifier means and for converting same to the pulse code signal at the preselected frequency. The second data processor means includes means for controlling communications between the master control station and the substation injection unit.

In accordance with other aspects of the present invention, the injecting means comprises transformer means whose primary is connected to receive said pulse code signals for transforming the relatively low voltage thereof to a higher voltage and current for injection onto the power lines, and tuned circuit means connected to the secondary of the transformer means and tuned to the preselected frequency for passing the pulse code signals to the power output bus of the substation. The system further includes input power contactor means connected in series with the rectifier means for connecting and disconnecting same to the three-phase power line voltage signal, output power contactor means connected in series with the inverter means for connecting and disconnecting same to the power lines, and power breaker means connected in series with the input and output power contactor means and including a shunt trip circuit responsive to fault conditions for tripping the power breaker means and opening the input and output power contactor means. The system further includes means for sensing the fault conditions, including means for sensing overtemperature of the solid state devices in the inverter means, means for sensing excessive shift of the neutral line of the power lines, means for sensing overcurrent in the output of the rectifier means, and means for sensing short circuits across the DC bus of the inverter means.

In accordance with another aspect of the present invention, the substation injection unit further comprises means connected to the power lines for detecting each pulse in the pulse code signals, and means in the second data processor means for determining whether the outputs of the pulse detecting means consist of a properly shaped and timed pulse. The substation injection unit may further include analog input means for connecting one or more analog inputs at the substation indicative of one or more system parameters for transmission to the master control station, and discrete input means for connecting one or more discrete inputs at the substation indicative of one or more system parameters for transmission to the master control station.

The means for controlling the output of the frequency converting means more particularly comprises means for controlling the firing time of the solid state devices in the three-phase rectifier means to select one of a plurality of output voltage levels as the predetermined level, and means for controlling the firing time and sequence of the solid state devices in the three-phase inverter means to establish an idle mode and an inject mode for the inverter means, the idle mode corresponding to the absence of a pulse in the pulse code signals, while the inject mode corresponds to the presence of a pulse in the pulse code signal at the preselected frequency.

The means for controlling the firing time of the solid state devices in the three-phase rectifier means includes means for receiving the three-phase voltage waveforms from the power line, means for determining when each of the voltage waveforms is greater than the other two waveforms and for providing output signals thereupon, and means responsive to said output signals of said determining means for turning on and off the gates of the solid state devices in the rectifier means. Also provided are means connected to the second data processor means for receiving an indication of the desired output voltage level of the rectifier means, and time delay means connected to the determining means and the voltage level receiving means for delaying the output of the determining means for a period of time in accordance with the desired output voltage level.

The means for controlling the firing time and sequence of the solid state devices in the three-phase inverter means comprises first means responsive to a mode select address signal from the second data processor means for selecting either the idle mode or the inject mode, second means responsive to the first means for generating register output timing signals, and register means responsive to the first and second means for providing gate signals in a predetermined order to the solid state devices in the three-phase rectifier means.

The master control station preferably includes means for polling each of the substation injection units to obtain information pertaining to its status, possible alarm conditions, and analog or discrete data generated at the respective substation, means for transmitting and receiving serial binary block messages to and from each of the substation injection units, the block messages including substation injection unit address data, substation injection unit function commands and the data signals, and means for prioritizing and executing group control commands to be sent to the substation injection units.

In accordance with another aspect of the present invention, there is provided a method for permitting an electric power utility to regulate a plurality of customer loads which comprises the steps of arranging the customer loads into individually controllable load control groups, establishing first, second and third types of control lists, each of the lists including at least one group control command for causing one of the load control groups to be turned on or off, actuating the first type of control list upon command to execute its group commands once, actuating the second type of control list upon command to execute its group control commands cyclically and repetitively, and actuating the third type of control list upon command to execute its group control commands cyclically and repetitively while taking into account the power demand on the utility. The method includes the step of dynamically adjusting the on and off times of the loads in those of said control groups belonging to the third type of control list by monitoring the utility's system power demand and lengthening the off times of the loads in those of the control groups in the third type of control list as the power demand increases. As an alternative to real time monitoring of the system demand, a load profile table may established which is indicative of the anticipated total power demand at predetermined intervals of time, the on and off times of the loads in those of the control groups belonging to the third type of control lists being adjusted by comparing the actual time with the load profile table. The method also contemplates the steps of periodically scanning each of the control lists to determine whether it should be activated or deactivated, periodically checking each of the group control commands in those of the lists that are activated to determine whether the command should be carried out, and generating data signals for those of the activated group commands when it is time to carry out the command.

In accordance with yet another aspect of the present invention, there is provided, in a system for controlling power distribution from a plurality of utility substations to a plurality of loads wherein a master control station under the control of an operator is in two-way communication with a plurality of microprocessor controlled substation injection units located respectively at the plurality of substations, a method of injecting a pulse code signal representing the desired control command onto the utility's power lines for transmission to receivers located at the loads comprising the steps of transmitting a first binary injection message representing a desired control command from the master control station to each of the plurality of substation injection units in turn, transmitting a second binary injection message representing the desired control command received in the previous step from each of the substation injection units in turn to the master control station, verifying at the master control station that the second binary message is the same as the first binary message, transmitting a binary commence keying command signal from the master control station to all of the substation injection units simultaneously, generating a pulse code signal representing the first binary injection message at each of the substation injection units previously verified, and injecting the pulse code signals onto the utility's power lines from transmission to a plurality of coded receiver units remotely located at the loads to effect the desired control command. The method further contemplates the steps of positioning a special receiver unit in each of the substation injection units for receiving, on a pulse-by-pulse basis, the pulse code signal injected on the power lines, storing the outputs of each of the receiver units in its respective substation injection unit until the full pulse code signal has been injected, and transmitting the stored outputs from each substation injection unit to the master control station in turn to verify that the desired control command has been effected.

BRIEF DESCRIPTION OF THE DRAWINGS

Various objects, features and attendant advantages of the present invention will be more fully appreciated as the same becomes better understood with reference to the following detailed description of the present invention when considered in connection with the accompanying drawings, in which:

FIG. 1 is an overall block diagram of a preferred embodiment of the system of the present invention;

FIG. 2 illustrates the communication message format from the master control station to a substation injection unit;

FIG. 3 illustrates the communication message format from a substation injection unit to the master control station;

FIG. 4 is a block diagram illustrating a preferred embodiment of a remote receiver unit;

FIG. 5 illustrates the format of the pulse code signals injected by the substation injection unit for transmission to the remote receiver units;

FIG. 8 is another block diagram illustrating the components of a pulse accumulator positioned in the substation injection unit;

FIG. 11 is a block diagram illustrating the software components of the master control station;

FIG. 13a–13d is a flow chart of the programs utilized in the substation injection unit microprocessor.

DETAILED DESCRIPTION OF THE PREFERRED EMBODIMENT

Table of Contents

Figure 6:
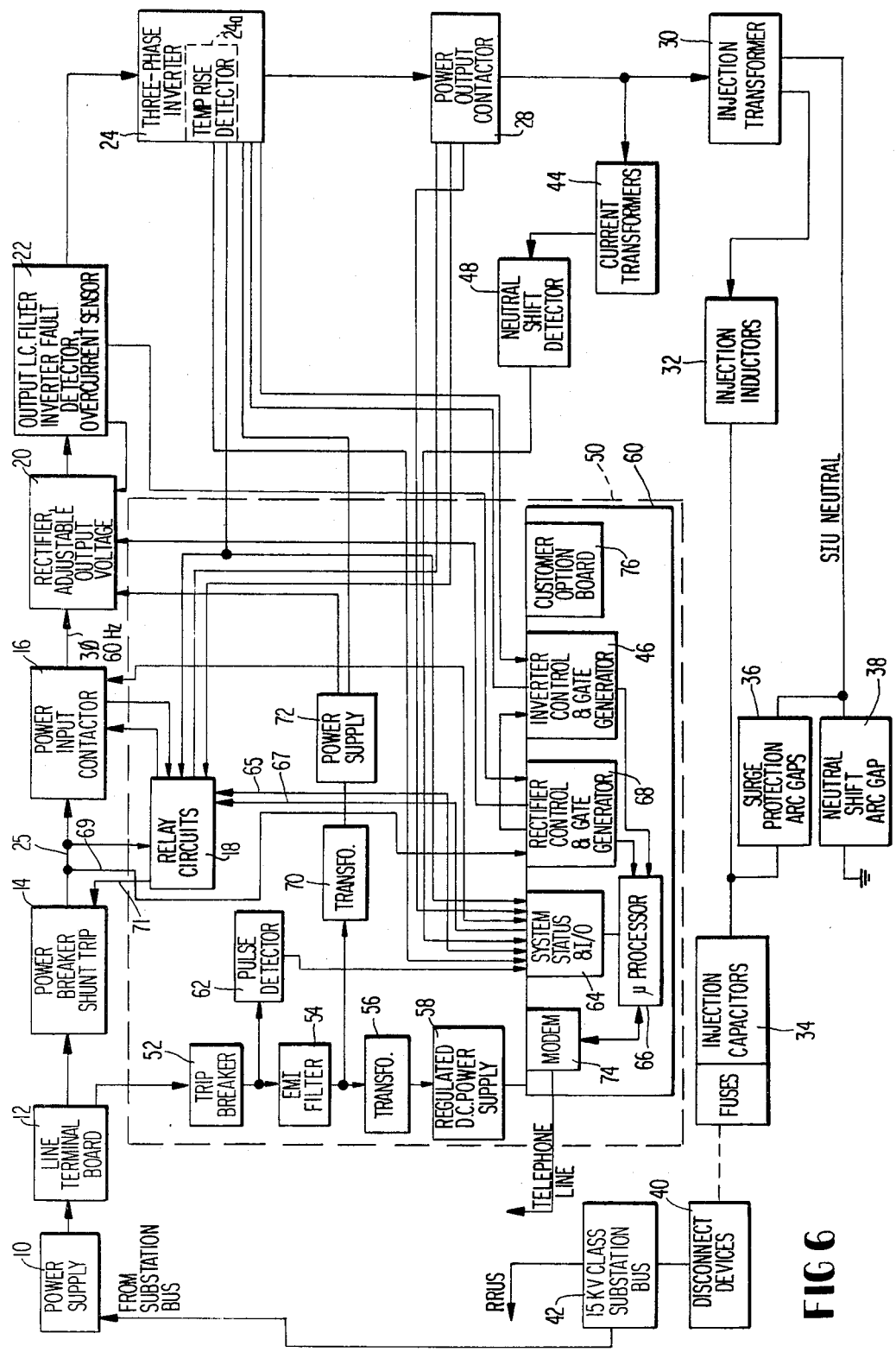
FIG. 6 is an overall block diagram of a preferred embodiment of a substation injection unit.

I. General System Description
   A. Master Control Station (MCS)
   B. Substation Injection Unit (SIU)
   C. Communications Between MCS And SIU
   D. Remote Receiver Unit (RRU)
II. Load Management Strategy
III. MCS Software
IV. Substation Injection Unit
   A. Overall Block Diagram B. Rectifier Controller
C. Inverter Controller
D. SIU Software

I. GENERAL SYSTEM DESCRIPTION

Referring first to FIG. 1, there is illustrated a block diagram of a preferred embodiment of the load control system of the present invention. A master control station MCS is in two-way communication with a plurality of substation injection units SIU over voice grade telephone lines. Any of a number of substation injection units SIU may be employed, one at each substation of the utility, depending upon the number of loads and areas desired to be controlled. Sixteen such substation injection units SIU are illustrated by way of example.

Each of the substation injection units SIU is, in turn, connected through the power lines of the electric company to a plurality of remote receiver units RRU (up to 200,000 in the example) which, in turn, are each connected to control the on and off times of a controlled device CD which may comprise, for example, an electric hot water heater, air conditioning compressor, or the like.

A. MASTER CONTROL STATION (MCS)

The master control station MCS preferably comprises a microprocessor-based computer terminal, such as the Hewlett-Packard Model 9835A which, together with special internal programming and desired input-/output devices, serves as an operator interface and as the originator/coordinator of all control instructions to the substation injection units SIU and the remote receiver units RRU. The master control station MCS may generate hard copy reports, archival records, activity files of control actions, operator interchanges, and may display system alarm information. The operator of the master control station MCS may interrogate the system files, adjust automatic control schedules and perform manual control action, in a manner to be described in greater detail hereinafter.

Communication between the master control station MCS and each substation injection unit SIU is over voice grade telephone lines utilizing standard baud rate asynchronous FSK modems. This requires a modem connected at the output of the MCS and at each input to an SIU. The message packets between the master control station MCS and each substation injection unit SIU are fixed length strings of binary characters to be described in greater detail hereinafter.

B. SUBSTATION INJECTION UNIT (SIU)

Each substation injection unit SIU consists broadly of three sections: a controller C, a frequency changer FC and an injection network IN. The controller C converts command and control messages from the master control station MCS into command signals for firing the solid state conduction controlled rectifying devices for the rectifier and inverter of the frequency changer FC. The controller C also responds to requests from the master control station MCS for alarm, status and data information. A special receiver is positioned in the substation injection unit SIU which is monitored by the controller C to provide information pertaining to the power line injection signal, amplitude and pulse position. The monitored information is sent to the master control station MCS on request in order to permit verification of the accuracy of the pulse code pattern transmitted by the substation injection unit SIU.

The frequency changer FC of the substation injection unit SIU comprises a 60 Hertz-to-injection frequency converter which rectifies the incoming power line's three-phase 60 Hertz signal to form a DC voltage of a controllable magnitude, which is then fed to a static inverter that is turned on and off under direction of the controller C to form the pulse code signal which becomes the pulse code injection message that is transmitted to the remote receiver unit RRU on the power lines of the utility.

The injection network IN comprises a set of passive circuit elements that provide a basic insulation level and a low impedance path from the frequency changer FC to the power line for the pulse code injection message while at the same time providing a high impedance path to block the 60 Hertz power line energy.

C. COMMUNICATIONS BETWEEN MCS AND SIU

Referring now to FIG. 2, there is illustrated the preferred message format for communications from the master control station MCS to a substation injection unit SIU. The block of data consists of nine characters of eight bits each. The first character is a frame sync character which preferrable comprises an ASCII start of text character. Following frame sync is an eight bit character which defines a particular substation injection unit SIU. The next character defines the particular function that the master control station MCS wishes the substation injection unit SIU to perform, in accordance with Table 1 below:

TABLE 1

| MCS/SIU MESSAGE INTERCHANGE | | | |
| --- | --- | --- | --- |
| No. | Type | Command To SIU | SIU Response |
| 1. | B | Set New Injection Code | Injection Code Received |
| 2. | A | Commence SIU Keying-All SIUs | None |
| 3. | B | Clear Command Register SIU #N | Status and Command Registers |
| 4. | B | Report Status and Command Registers | Status and Command Registers |
| 5. | B | Report Last Injection Code | Last Injection Code Sent |
| 6. | B | Report Status and Data for Measurement Point | Status and Data for Measurement Point |
| 7. | C | Execute-SIU #N | Status and Command Registers |
| 8. | B | Set Injection Power Level | Injection Power Level Received |

Following the SIU function block are five eight bit data characters for defining, for example, the forty bit pulse code desired to be injected onto the power lines. At the end of the message block is a frame sync character which preferably comprises an ASCII end of text character.

Transmission of the blocks of characters illustrated in FIG. 2 from the master control station MCS onto the telephone lines are received by all substation injection units concurrently. While most transmissions are addressed to only one SIU, some may be addressed to all SIUs. Only an addressed SIU will respond to a command from the MCS. The format of the communication transmissions from the SIU to the MCS illustrated in FIG. 3 and is seen to essentially correspond with the MCS to SIU communication format illustrated in FIG. 2. In FIG. 3, each transmission from an SIU to the MCS is preceded by a line settle period of approximately 200 milliseconds, while there is a 50 millisecond delay between the end of each SIU transmission and the start of the next MCS command transmission. Each of the characters illustrated in FIGS. 2 and 3 have a start, stop and optional parity bit. The overall message consists of a frame sync character, an SIU address character read from an internal constants register (rather than being a reflection of the in-bound station address from the MCS), an SIU function character, and five data characters followed by an end of text character as the frame sync. The carrier on and off intevals correspond to the times that the modem carrier of the SIU is turned on and off.

Table 1 above illustrates exemplary SIU function commands forwarded from the master control station MCS to the substation injection units SIU. These messages are encoded in the "SIU FUNCTION" block of FIG. 2. There are three general types of messages exchanged between the master control station MCS and the substation injection units SIU. Type A messages are recognized by all substation injection units. There are no SIU responses to the MCS for Type A messages since the SIUs are tied to a common party line and their responses would be mutually interfering. Type B messages are directed to a single SIU. Although the outbound message from the master control station MCS is monitored and passed through the initial stages of processing and decoding by all SIUs, only the single SIU that has a station address match with a station address code contained in the incoming message will continue the processing. Further, for Type B messages, the MCS receives a response from the addressed substation injection unit SIU. Type C messages consist of an order execution command directed to one substation injection unit SIU. This message enables execution of whatever command has been previously established in a software implemented command register in the addressed substation injection unit SIU. In other words, the contents of the command register in the addressed substation injection unit SIU has been previously established by a Type A or Type B message.

The message interchange between the master control station MCS and the substation injection unit SIU is based upon a setup-variety-execute sequence of commands. Message Nos. 1, 3 and 8 in Table 1 are setup commands. The substation injection unit SIU will store the received setup command in an internal software implemented command register. It will also set an internal command pending flag which will remain set for approximately 20 seconds. The substation injection unit SIU will respond to the setup command by sending back to the MCS the contents of its command register which will be a replica of the actual message received. The MCS will compare the SIU response to the original message sent to insure that the SIU is setup correctly. If it is not, there will be three more attempts to set up the SIU correctly. If these attempts fail, the addressed SIU will be marked off-line and designated as "removed from service". If the addressed SIU was set up correctly, the MCS will go to the next SIU and try to set it up, as may be required.

After all of the desired SIU's have been set up and verified, the MCS will send one of the execute commands which consist of Message Nos. 2 or 7 in Table 1. If the execute command is received by the SIU's while the command pending flag is set, the command that was setup will be implemented. If the command pending flag is not set when the execute command is received, the SIU will ignore it and do nothing. Such a condition will be detected by the master control station MCS when it examines the SIU status during routine polling.

Message Nos. 4, 5 and 6 request the status of a particular substation injection unit SIU. Not being setup commands, Message Nos. 4, 5 and 6 do not require an execute command before the addressed SIU will respond. That is, the MCS will request the status and the addressed SIU will respond with the desired status information. Message Nos. 4, 5 and 6 are transmitted twice, and after each transmission, the addressed SIU responds. This enhances system security and insures that the master control station MCS has the correct status information. Following is a discussion of each of the message numbers in Table 1.

Message No. 1 is a command to one substation injection unit SIU to load its software implemented injection register with a specific 40 pulse code signal to be injected under local SIU timing control commencing with the reception of Message No. 2. The SIU response to Message No. 1 is the actual injection code that the SIU received which will be compared in the MCS to the injection code that was sent to insure that the set up message was correctly received by the addressed SIU. Each SIU will be set up in turn until all on-line SIUs have been loaded with the injection code and verified. The MCS will then send Message No. 2 which will initiate the transmission of the 40 pulse code injection message. The controller in the SIU will respond to the 40 pulse code injection message to control the on and off timing of each individual pulse.

Message No. 3 is a command to clear the command register in a particular SIU. The SIU will respond with its status and the contents of its command register. The MCS will check the response to insure that the command was correctly received at the SIU. If it was, the MCS will send Message No. 7 to clear the command register in the addressed SIU. This command will be used on a selective basis to cancel a pending control order.

Message No. 4 is a command to a particular SIU to report its status and the contents of its command register. The SIU response is a message containing the status information read from the SIU status register and the contents of the SIU command register. The status report includes several on/off type of conditions or presence/absence type of conditions that are then interpreted by the MCS as alarm or status information. Items of this nature include overtemperature of the rectifier, overtemperature of the inverter, overtemperature of the cabinet interior, inlet voltage out of range, and the like.

Message No. 5 is a command to a specific SIU to report the last 40 pulse code pattern that was injected by the addressed SIU. The latter responds with a binary encoded translation of the 40 pulse code pattern read from a special injection monitor receiver connected within the SIU.

Message No. 6 is a command to a specific SIU to report its status and the current value for an analog measurement point. There may be one or a plurality of such analog measurement points located within the SIU, which will be described in greater detail hereinafter. In response to this command, the addressed SIU will read the measurement point, digitize its value, and send the representation back to the MCS.

Message No. 7 is an execute command which directs an SIU to execute a previously stored command, other than pulse code injection messages which are executed by Message No. 2. Message No. 7 is an execute command addressed to only one SIU, and the response is a report by the addressed SIU of its status and the contents of its command register.

Message No. 8 is a command to a selected SIU to set a new injection power level. The response to this command is the status and contents of the command register for the addressed SIU. The response will be compared to the original message that was sent to insure that the SIU is set up correctly. If it is, Message No. 7 will be sent to implement the new injection power level. Message No. 8 is used to dynamically adjust the injection power level for the best overall system performance and will be set based upon, among other things, the number of SIUs that are on-line versus the number of SIUs that are on the system.

D. REMOTE RECEIVER UNIT

Illustrated in FIG. 5 is a preferred format for the pulse code signal transmitted by the substation injection units SIU to the remote receiver units RRU. The control messages are encoded into start, preselect, and execute pulses. The timing of each preselect and execute pulse with respect to the start pulse is precisely controlled. The preferred code includes 41 pulses: the start pulse, which is common to all control messages, numbered 0; seven preselect pulses numbered 5, 10, 15, 20, 25, 30 and 35; and 28 execute pulses numbered 6 through 9, 11 through 14, 16 through 19, 21 through 24, 26 through 29, 31 through 34, and 36 through 39. Every control message consists of a start pulse followed by a preselect pulse, followed by an execute pulse. The total preselect-execute pulse combinations in the preferred embodiment is 112, which allows 112 independent control functions, or 56 simultaneous control functions with one control message transmission. As may be appreciated from FIG. 5, the start pulse is a sync pulse of approximately 0.833 second duration followed by a 2.29 seconds rest period. Although one pulse string may contain several interleaved control commands, in typical applications only a few pulses will be active in any one pulse string. Since the start pulse activates all remote receiver units RRU, each pulse code message or string is separated by an inactive period of approximately 94 seconds to allow any falsely started RRUs to run to their reset position.

FIG. 4 illustrates a block diagram of a preferred embodiment of a remote receiver unit RRU which may comprise, for example, a Sangamo Weston Model 100 receiver. From the power line, the pulse code signal is first received by a frequency selector element 11 that discriminates between a valid control signal and all other parasitic frequencies which may exist on the power lines. Valid frequency signals are passed by frequency selector 11 to a decoder/selector 13 which discriminates between all of the pulses in a particular pulse code so that the particular remote receiver unit RRU acts only on the pulses that the receiver has been coded to recognize. When a proper pulse code signal is decoded by decoder/selector 13, the latter controls a contact block 15 which comprises a set of controlled output contacts for switched loads 17 and 19 which are capable of being activated simultaneously or independently. Both contacts in contact block 15 are preferably single pole, and the operating mechanism allows for positive latching so that different control messages are required to change the contact state from "ON" to "OFF", and vice versa. The absence of a control message or a power failure will not change the state of a latched contact.

In a preferred embodiment, the decoder/selector 13 comprises an electromechanical timing chain which monitors the presence or absence of a pulse in each of the 40 possible positions. When the proper combination of positions or slots have been filled, the output contact 15 is opened or closed. Each remote receiver unit is precoded so that it responds to one and only one pulse code signal; therefore, the switched loads 17 and 19 must be of the same class, for example, electric hot water heaters. In order to control, for example, an air conditioning compressor in the same location, a separately encoded remote receiver unit RRU must be connected thereto to receive the pulse code signal.

II. LOAD MANAGEMENT STRATEGY

In the best mode presently contemplated for carrying out the present invention, with the 40 pulse injection code signal and remote receivers described above, there are 56 independently operable sets of contacts (on/off pairs) or load control groups. Each contact can control a separate type of load, such as electric hot water heaters, air conditioner compressors, street lights, or the like. Therefore, the operational programs for the master control station MCS has 56 predefined load control groups. Each group can be commanded to turn on (the contact in the receiver will close) or to turn off (the contact in the receiver will open). By turning the load groups on and off at the appropriate times, a desired load management strategy can be implemented. The system operator determines which group to turn on and off and when they should be turned on and off to best control the system load. The program in the master control station will implement the strategy which is set up by the operator.

The control commands that turn the load control groups on and off are linked together by the operator to form control lists. There may be, for example, 20 independent control lists, each containing one or more control commands, which are grouped into the lists according to different characteristics that enable management of various types of loads.

The management strategy of the present invention defines three different types of control lists, referred to hereinafter as Type 1, 2 and 3. Type 1 control lists are of a single pass nature. That is, when the type 1 list is activated, the group control commands in the list are transmitted at a predetermined time from the time the list is activated. When the end of a type 1 list is reached, the control sequence is finished and the list is deactivated. Type 1 control lists are typically used for emergency load shedding or other manually initiated, one shot, preplanned sequential control activity.

Type 2 control lists have a cyclic and repetitive nature. When a type 2 control list is activated, the group control commands in the list are sent in a predetermined order. When the end of the list is reached, the program goes back to the beginning of the list to start over. This cyclic action continues until the list is deactivated by an external event or by operator intervention. A type 2 control list is typically utilized for cycling hot water heaters, air conditioners, or street lights.

Type 3 control lists are characterized by a variable duty cycle. Type 3 lists can dynamically adjust the amount of time a controlled load is allowed to be on, depending upon the demand on the electrical network. As the demand on the network increases, the time the loads are allowed to be on decreases, thereby reducing the total demand. The group-off commands for a type 3 control list are evenly spaced over the duration of the cycle. When it is time to turn the next load control group off, the program calculates a new on-to-off ratio based upon the current value of one or more system parameters such as total demand. The new ratio is used to determine the length of time this group will be left off. The off time interval is subject to minimum and maximum limits established by the operator. The program will turn such a group off at the time specified in the list and then turn it back on after the calculated off time interval has elapsed.

The control lists may be initiated by a manual operator action, by an operator-entered load curve, by a discrete input received from the substation injection unit SIU or by a combination of analog inputs from the substation injection unit SIU. The control lists may be load dependent or load independent, and may run on particular days of the week, weekends, holidays or any desired combination of same.

III. MCS SOFTWARE

The software program for the master control station MCS consists of three basic functional portions. The first portion, which may be referred to as the operator interchange module, handles the interaction between the system and the operator including control of the keyboard and generation of displays on the CRT. The second portion, known as the load profile module, monitors the control lists by periodically, for example, once a minute, checking to see whether any of the lists should be started or stopped, or if a group control command should be sent to a substation injection unit SIU. The third portion of the program, known as the line protocol module (which runs most of the time), handles the communications between the master control station MCS and the substation injection units SIU. Between injections of group control commands, the master control station MCS routinely polls each substation injection unit SIU for status information and telemetry data. It also checks each substation injection unit SIU for eight internal status conditions and monitors the status of eight customer discrete inputs and one analog input. Between the polling of each substation injection unit SIU, the MCS updates the display that is currently on the CRT.

Referring now to FIG. 11, a block diagram illustrates the software interaction of the various modules with various hardware which together comprise the master control station MCS. The operator interchange module is indicated by reference numeral 400 and handles the operator inputs from keyboard 404 while generating a display on CRT 402. While being the largest module in the system, it runs on a very low priority. The inputting of parameters through keyboard 404 or the generation of displays for CRT 402 is accomplished through the use of a System Menu which is a list of items that will direct the computer to the area the operator would like to manipulate. The program is preferably written so that data entry is operator oriented, that is, the computer asks a question by displaying it on the CRT 402 and the operator supplies the answer by typing it in through the keyboard 404. Each operator entry is checked for correctness and appropriateness at the time it is entered to insure the security and integrity of the system. A printer 416 may be connected as an output device to provide a hard copy of the CRT display, if desired.

A real time clock 418 plugs into the programmable computer that forms the master control station MCS in order to provide a real time reference for interrupting the system periodically to perform certain functions. For example, certain software functions are implemented once a minute, certain functions are implemented once every five seconds, and the like.

The data base for the operator interchange module 400 is formed by a control list and command assignment table 406, SIU tables 408 and system status files 410. As the names of the blocks imply, they contain the tables and files that other modules manipulate and provide means with which the other modules can communicate information. The tables 406 and 408 and files 410 together may be referred to as the system files module and information is stored therein pertaining to the substation injection units (SIU), the analog and discrete inputs, the control lists, the group elements, the CRT displays and the like.

Another program known as the initialization module and indicated in FIG. 11 by reference numeral 414 is run immediately after the program tape is loaded into the computer in order to establish the data base. Initialization module 414 initializes the hardware interfaces connected directly to the computer. This program is normally run only once per program load, and is connected to a tape drive 412 which stores the operator-entered information in the event of a temporary power outage.

The load profile module is indicated by reference numeral 420 and handles activation, running and deactivation of the control lists. Module 420 also manipulates the analog and the discrete inputs as read from analog and discrete input tables 424, as well as information stored in a load profile table 422. Load profile module 420 calculates and controls the type 3 control list off-time intervals. Module 420 is run periodically, e.g., once a minute, based upon timing information received from real time clock 418. Control list information to load profile module 420 is fed from control list table 406. Module 420 goes through each list in turn: if the list is disabled, it will go on to the next list; if the list has been enabled by the operator, module 420 will check the various parameters to see if activation or deactivation of the control list is called for. Module 420 then examines the group control commands within those lists that are activated and, if there is a time match, module 420 takes the group control command information and places it on a command stack 426 which acts as a buffer areas for the line protocol module 428 for subsequent transmission to the substation injection units.

As explained above, for a type 3 control list, the load profile module 420 calculates a new on-to-off ratio at the beginning of each cycle based upon the current value of certain system parameters, which typically include total system demand. Such information may be obtained by load profile table 422 from information previously stored in the analog and discrete input tables 424, which information is obtained from either analog inputs and/or discrete inputs located at the substation injection units SIU. Alternatively, in the event the particular system installation is not provided with analog or discrete inputs, type 3 lists can still be controlled by information previously stored in load profile table 422 which, in essence, is a tabular listing of the anticipated megawatt demand on an hourly basis. The load profile table 422 can be updated by the operator via operator interchange module 400 at any time.

Figure 14:
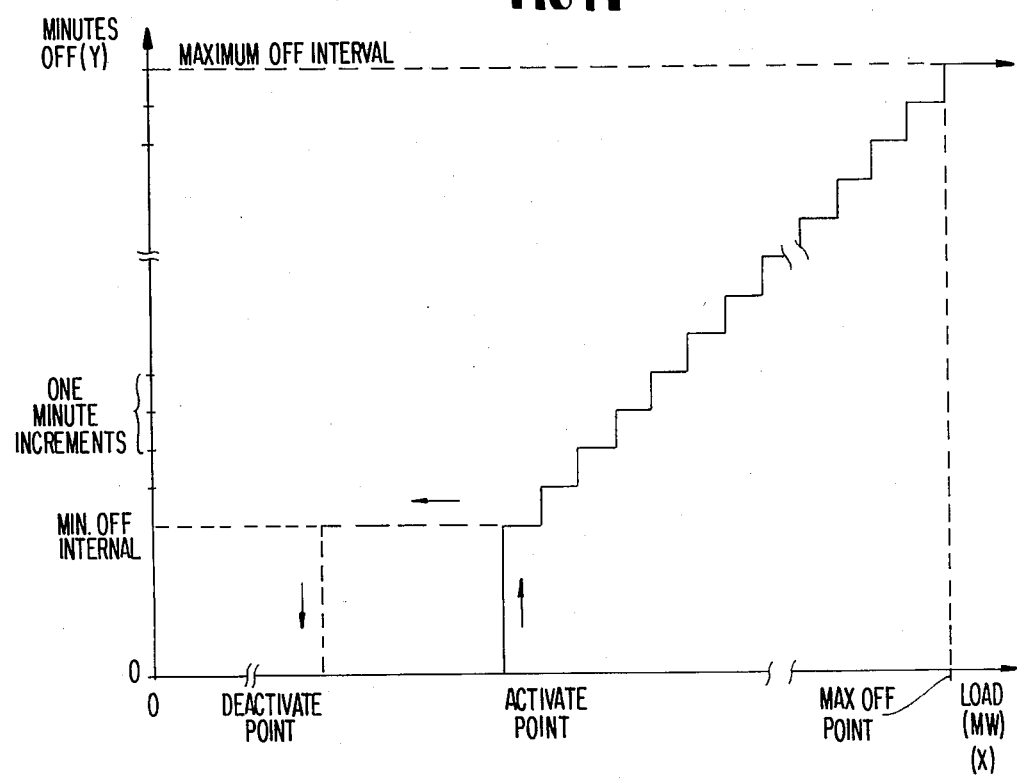
FIG. 14 is a graph which illustrates a typical load profile table utilized in the master control station.

Whether utilizing the load profile table 422 or the analog and discrete input tables 424, the on-to-off time ratio is related to the desired system parameter of the utility by a graph such as that illustrated in FIG. 14. The off-time interval is indicated on the Y-axis and is directly related, over a limited range, to the network demand in megawatts on the X-axis. For each type 3 control list, the operator enters the demand at which he wants the control list to become active (the activate point) and the demand at which the group in the list would be turned off for the maximum off-time interval (the maximum off point). The off-time interval may be calculated by the equation:

$$Y = \begin{pmatrix} \text{max off} \\ \text{time} \\ \text{interval} \end{pmatrix} \cdot \left( \frac{X \text{ (in MW)} - \text{Activate Point (in MW)}}{\text{Max Off Point (in MW)} - \text{Activate Point (in MW)}} \right)$$

for values of X that are greater than or equal to the activate point. The value Y will be rounded off to the closest integer and will be used as the off-time interval subject to two conditions: first, the minimum off-time interval is the cycle duration divided by the number of load control groups in the list and must be at least, for example, four minutes long; and, second, the maximum off-time interval is less than or equal to the limit defined by the operator. Otherwise, the off-time interval can vary by one minute increments as the load varies.

For values of X that are greater than the maximum off point, the off-time interval will be fixed at the upper limit defined by the operator. When the value of X has dropped so that it is between the deactivate point and the activate point, the off-time interval will remain at the minimum off-time interval. When the value of X falls below the deactivate point, the program will send commands to turn on all load control groups in the list and then deactivate the list.

As stated above, for any group control command for which a time match is determined in load profile module 420, the latter transfers the command to the command stack 426. If at any time there is insufficient room on command stack 426 for the load profile module 420 to put on a group control command, the operator will be notified by an alarm message, and the module 420 will try to place the group control command on the stack 426 again after a one minute delay.

The purpose of the line protocol module 428 is to process group control commands on the command stack 426, transmit messages to and receive messages from the substation injection units, poll the substation injection units for status conditions, retrieve substation injection unit analog and discrete inputs, and maintain communications and injection error statistics.

When the line protocol module 428 runs, which may be, for example, once every five seconds, it will first check the command stack 426. If there are no group control commands on stack 426, the line protocol module 428 will begin a polling sequence in which all substation injection units (SIU) will be requested to report their status and analog and discrete inputs, one SIU at a time. The received data will be used to update the system files 410. Further, the SIU status indicators will be checked for any changes or alarm conditions. If an alarm condition is detected, an alarm status flag will be set so that an alarm display will be generated by the operator interchange module 400. Any new analog or discrete inputs will be fed to the analog and discrete input tables 424 from line protocol module 428. If any of the analog or discrete inputs have changed and represent an alarm condition, an alarm status flag will be set. When the polling of each SIU is complete, line protocol module 428 will return to check the command stack 426 once again.

If there is one or more group control commands on stack 426, line protocol module 428 will try to combine the 40 pulse code injection messages. If the commands cannot be combined, the module 428 will send them in order of the priority of the control list from which the commands came. Transmission of the pulse code injection messages follows the setup-verify-execute sequence described hereinabove. That is, the pulse code injection message is first set up in each substation injection unit and verified, one at a time. After verification, a commence keying command is sent twice to all substation injection units for communications verification. The commence keying command initiates the pulse code injection process at the substation injection units which takes, in the preferred embodiment, approximately 94 seconds to complete plus a 94 second false start time, for a total of from two to three minutes per injection. An interface module 430, known as an RS-232, is disposed between the line protocol module 428 and a modem 431 which converts commands from the computer into signals for transmission on the telephone lines by the modem. After injection has been completed, the line protocol module 428 obtains the injection code from a special receiver in each substation injection unit that monitors the pulse code signals going onto the power lines. The received code from the special receiver in each SIU must match the pulse code signal transmitted, or an injection error is noted for that SIU. If an injection error is noted, the same message is re-injected. If two consecutive errors are noted, the particular SIU is disabled and an alarm indication is given to the operator.

After an injection message is set up by the line protocol module 428, the latter will update the status of the load control groups involved in the particular message. This is done so that the operator interchange module 400 can periodically write the current control list and group status on the system tape 412. The line protocol module 428 will also deliver to an archival tape module 440 the load control group commands involved in this message so that the archival tape module 440 can write the commands on a separate tape drive unit 442 for archival storage purposes.

The line protocol module 428 also maintains the communication and injection error statistics. Several sections of the line protocol module 428 function like I/O drivers. All communications line messages are handled by the message as opposed to by the character (a message comprises several characters). This allows the line protocol module 428 to stop running until the transfer of the entire message is completed so that other program modules are able to run while the line protocol module 428 is stopped. However, when message transfer is complete, the RS 232 interface 430 interrupts the MCS to initiate running of the line protocol module 428 once again. The latter will then check the received message for errors, update the SIU status, analog and discrete files, and the like. It stops running when another message transfer begins to allow the previously interrupted module to continue. The real time clock 418 together with the interface 430 restarts the line protocol module 428 in the event the message transfer is incomplete.

The MCS analog and discrete input module 432 is optional and is required only when there may be analog or discrete inputs connected directly to the MCS. When module 432 runs, it works together with the analog and discrete input interface tables 424 to bring in the current values of the inputs. It will then update the analog and discrete files in the system files 410 in the same manner as the line protocol module 428 does with the SIU analog and discrete inputs. Reference numeral 434 indicates a standard interface bus utilized with the module 432.

The SCADA module 436 is also optional and comprises a supervisory control and data acquisition system, which is a higher level computer that can control the MCS. A command interface 438 may be required for SCADA module 436.

Figures 12, 12A:
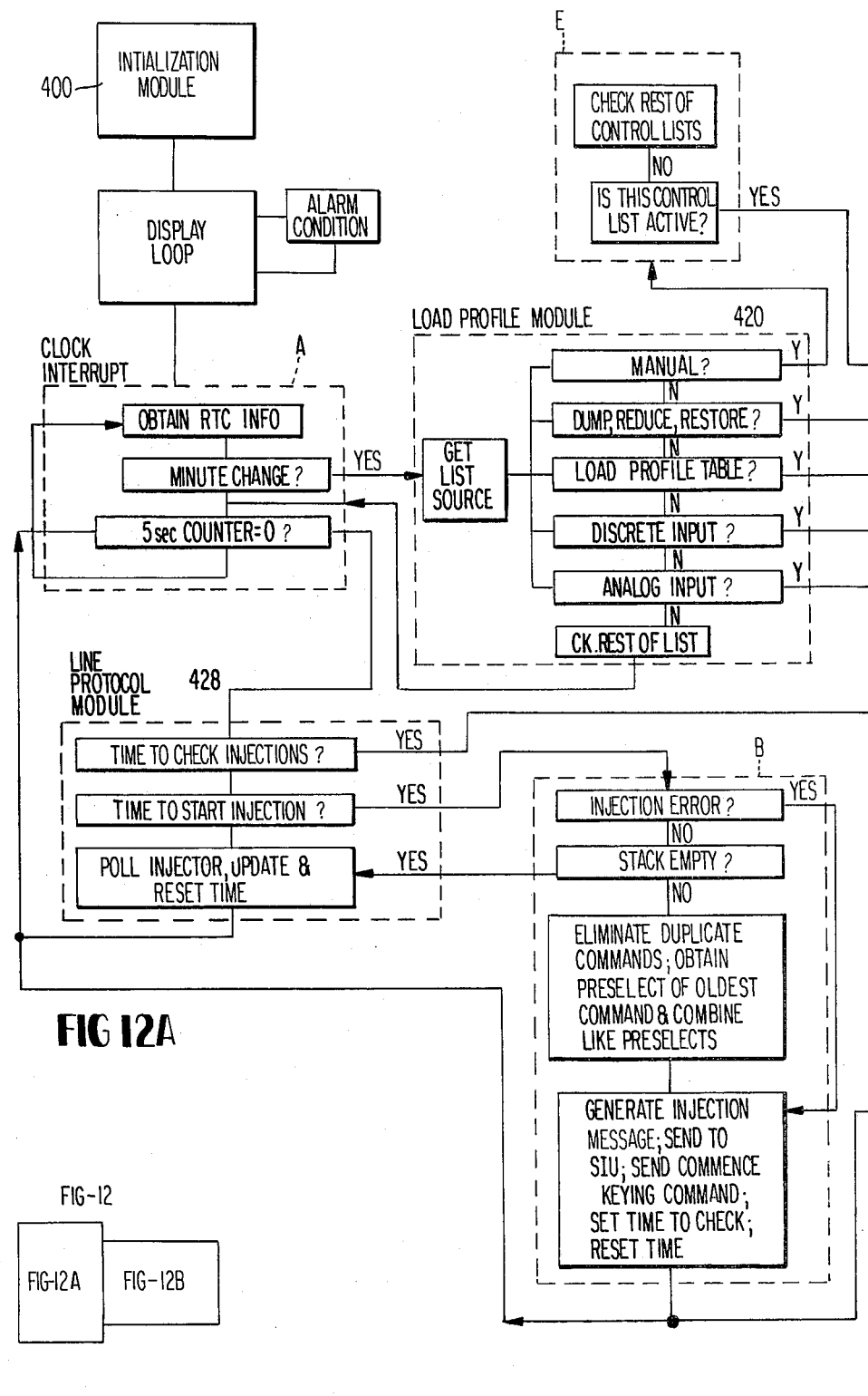
FIG. 12, 12a, 12b is a flow chart of the programs utilized in the master control station.
Figure 12B:
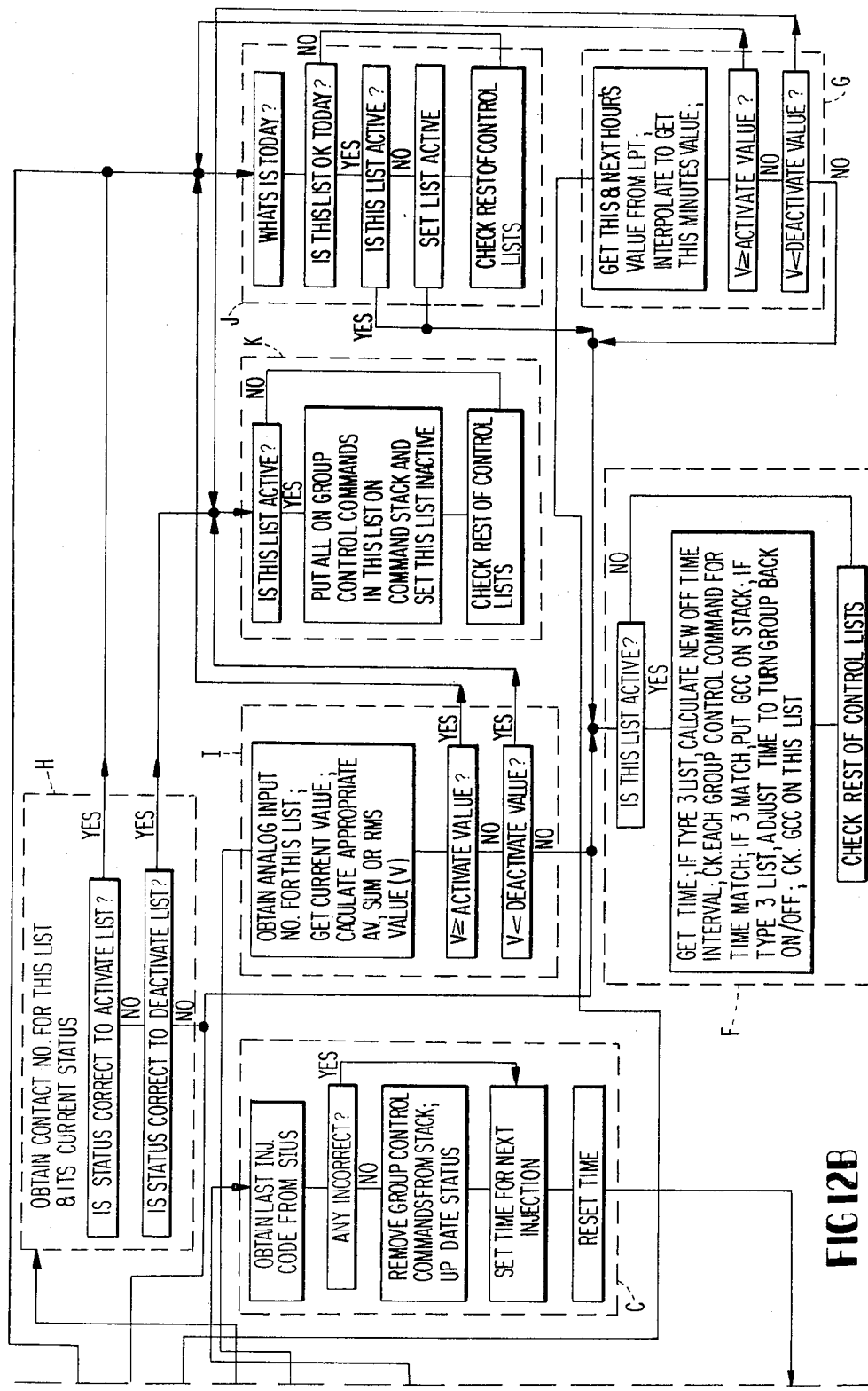

The system software is illustrated in flow chart form in FIG. 12. In the flow chart of FIG. 12, reference numeral 414 refers again to the initialization module wherein the data base is established, initialized and updated from the previously stored information on tape drive 412. Further, in the initialization module 414, the difference between the current time and the time the last record was written on the system status files 410 is determined. If greater than a predetermined time interval, the operator is asked to enter the new date and time, and the last known list and group status are displayed. The main program is then loaded from the tape drive 412, and the display loop DL is entered.

In the display loop DL, if an alarm condition is indicated the alarm display is generated. If no alarm condition is present, the requested display is generated, and the program moves on to the clock interrupt cycle A.

In the clock interrupt routine A, the current date and time are obtained from the real time clock. If the latter has changed to the next minute, the program loops to the load profile module 420. If not, clock interrupt A checks to see if it is time to go to the line protocol module 428. This may be determined, for example, by a five second internal counter which is decremented to zero.

As pointed out above, the line protocol module 428 is run once every five seconds, and is therefore the highest priority routine in the program. The line protocol module 428 first tests to see if it is time to check an in-progress injection. If it is, the program loops to routine C which first obtains the last injection code from each substation injection unit. This information is obtained from the special receiver in each SIU. A comparison is then made between the received SIU injection codes and those transmitted to determine if there are any errors. If so, an injection error is indicated. If there are no errors, the group control command that made up the injection is removed from the command stack 426. The status tape file is then updated with the current list and group status whereafter the time is set for the next injection (approximately 94 seconds later), and the five second counter is reset to establish a new time for checking the line protocol module 428.

If it is not time to check an in-progress injection, the line protocol module 428 checks to see if it is time to start a new injection. If so, the program loops to routine B where there is first a test to see if there are any injection errors. If there are none, routine B checks the command stack 426 to see if it is empty, that is, to see whether or not there are any group control commands awaiting transmission. If not, the line protocol module 428 polls the injection substation unit, updates the analog, discrete and internal status files from the polling response, and resets the five second counter in clock interrupt A.

If there is one or more group control commands on the command stack 426, routine B first eliminates any duplicate group control commands, obtains the preselect code of the oldest command, looks for other group control commands with the same preselect code, and combines commands with the same preselect. The injection message is then generated and sent to each substation injection unit that is on-line and enabled. Routine B then verifies the injection message, and upon verification, sends the commence keying command to all SIUs. Thereafter, routine B sets the time for checking this injection (approximately 94 seconds later) and sets a new time to check the line protocol module 428.

Referring back to the clock interrupt routine A, if a minute change has gone by, the program cycles to the load profile module 420 wherein the first action taken to to determine the source of the list. If the list source is a Manual Key on the keyboard, the program cycles to routine E to determine if the particular control list is active. If it is not, the rest of the control lists are checked and the cycle returns to the load profile module 420. If the particular control list indicated by the Manual Key is active, the program cycles to routine J which is an "activate" routine common to all lists found active. In routine J, the first determination is the days that this particular list is allowed to run, and the type of day that today is, that is, whether today is a weekday, Saturday, Sunday or holiday. It is then determined whether this particular list is allowed to run today. If it is not, the rest of the control lists are checked and the routine returns to the load profile module 420. If the list is allowed to run today, the list is then checked to see whether it is already active, and, if it is not, the list is set active and the program cycles to routine F. If the list is active, the current time is obtained, and, if the list is a type 3 list, the new off-time interval is calculated. Each group control command in the list is then checked for a time match. For each time match found, the corresponding group control command is placed on the command stack to await transmission via the line protocol module 428. If the list is a type 3 list, the time is adjusted to turn the group back on or off. The remaining group control commands in this list are similarly checked, after which the rest of the control lists are checked.

Routine F is also the routine which is enabled if the list source is from the Dump, Reduce or Restore Keys on the keyboard. The lists assigned to the Dump, Reduce and Restore Keys are normally used for emergency situations only, and therefore have priority over other load management functions in the system. Within these three manually-initiated actions, the Dump list has priority over the Reduce list and the Restore list, while the Reduce list has priority over the Restore list. All lower priority lists are disabled when one of these lists is initiated by pressing the corresponding key. Further, all entries that are currently on the command stack are removed.

Returning to module 420, if the list source is the load profile table, the program cycles to routine G wherein values are obtained from the load profile table for this hour and for the next hour. The values are then linearly interpolated to obtain a value for the present minute. If this value is greater than or equal to the activate value for this list, the program cycles to the activate routine J. If the interpolated value is less than the deactivate value for this particular list, the program cycles to the "deactivate" routine K.

In routine K, if the list is currently active, all of the ON group control commands in the list are placed on the command stack, and the list is then set inactive.

Referring back to routine G, if the interpolated value is greater than the deactivate value but less than the activate value, the program cycles to routine F which was explained above.

If the list source on load profile module 420 is a discrete input from the substation injection unit, the program cycles to routine H wherein the contact number for this list and its current status is obtained. If the status of the contact number is correct to activate the list, the program cycles to routine J. On the other hand, if the status is correct to deactivate the list, the program cycles to routine K. Otherwise, the program cycles to routine F where the group control commands are tested for a time match and placed upon the command stack.

If the list source in the load profile module 420 is from an analog input, the program cycles to routine I wherein an analog input number is obtained for the list along with its current value for all analog inputs. The appropriate value is then calculated (average, summation or RMS), and the value is tested to see if it is greater than or equal to the activate value, or if it is less than the deactivate value. If the former is true, activate routine J is enabled, and if the latter is true, deactivate routine K is enabled. If the value is between the activate and deactivate points, routine F is enabled.

Not shown in FIG. 12 are the Menu Key routines which permit the operator to select a display indicator or enter system parameters according to the system menu, as well as the Keyboard Interrupt routine which allows input from the keyboard.

IV. SUBSTATION INJECTION UNIT

A. Overall Block Diagram

Referring now to FIG. 6, there is illustrated a functional block diagram of a preferred embodiment of a substation injection unit in accordance with the present invention. Power is fed to the substation injection unit from the main power bus 42 of the power utility's substation, which is of the 15 kilovolt class. Bus 42 also transmits the utility's power to the remote receiver units RRU. A power supply for the substation injection unit is indicated by reference numeral 10 and supplies, for example, 60 Hertz, 240 volt, 36 amp, three-phase three wire power to a line terminal board 12 to which the interconnect cables for the interior of the substation injection unit are connected. From board 12, power is fed through a power circuit breaker 14 which has a shunt trip input 71 that is activated in a manner which will be described in greater detail hereinafter. Three-phase power is fed along line 25 from power breaker 14 to a 60 Hertz power input contactor 16. Contactor 16 connects the incoming power to a rectifier 20 under the control of control relay circuit 18, in a manner which will be described in greater detail hereinafter.

Rectifier circuit 20 comprises a standard SCR phase-controlled rectifier bridge under the control of a rectifier controller 68 in a manner to be described in greater detail below. Rectifier 20 acts to change the incoming three-phase AC power into a DC level at its output of approximately 325 volts. It should be noted, however, that the DC voltage level output of rectifier 20 may be adjusted to deliver one of a number of suitable output DC voltages by means of adjusting the firing angle of the silicon-controlled rectifiers (SCRs).

The DC output from rectifier 20 is then fed to an LC output filter 22 that smooths the AC ripple on the DC voltage. Also noted in box 22 is an inverter fault detector which basically detects what is known as a shoot-through condition in an inverter 24 that creates a short on the DC bus. The fault detector in block 22 acts to provide an alternate path for any surges in order to prevent the rectifiers in the inverter from being burnt out. Shoot-through conditions are also noted in the rectifier controller 68, in a manner which will be described more fully below.

Also positioned in block 22 is an overcurrent sensor which simply senses excess current on the DC line and, upon such detection, acts to disable the SCRs in rectifier 20 to prevent damage thereto.

Reference numeral 24 indicates a three-phase static inverter which is preferably of the form known in the art as a McMurray inverter. Inverter 24 converts the incoming DC voltage and current to AC voltage and current at a frequency which corresponds to the desired preselected pulse code frequency. By way of example, the pulse code frequency may be selected to be 340 Hertz. The presence or absence of a particular pulse in the 340 Hertz output of inverter 24 depends upon inputs received from inverter controller 46 which basically turns on and off the SCRs in inverter 24 in accordance with the specific pulse code signal desired for a particular injection message.

Inverter 24 operates in one of three modes under the control of inverter controller 46. One mode may be denoted the OFF mode wherein none of the SCRs in inverter 24 are conducting. Another mode may be described as the INJECT mode wherein the SCRs of inverter 24 are being turned on and off in a specific sequence to create a pulse code pattern at 340 Hertz that corresponds to the desired injection message communicated to inverter controller 46 by microprocessor 66, in a manner which will be described in greater detail hereinafter. A third mode may be denoted the IDLE mode and corresponds to those periods of time when no output pulse is present in the pulse code train. During IDLE, the lower three SCRs in the SCR bridge of inverter 24 are conducting which in conjunction with the feedback diodes provides a continuous short circuit on the primary of an injection transformer 30 to serve as a trap circuit for the 60 Hertz feedback current. The inverter 24 is sized to handle the combined current requirements of the ripple or injection frequency current and the desired amount of 60 Hertz backfeed current. The SCRs in inverter 24 operate under forced commutation as controlled by inverter controller 46.

From the inverter 24, the pulse code signal is fed through a power output contactor 28 which is under the control of control relay circuit 18, as is power input contactor 16. When the main power breaker 14 opens, power is removed from input and output contactors 16 and 28, respectively, via control relay circuits 18 to immediately isolate the SCRs in rectifier 20 and inverter 24 against damage. The status of input and output contactors 16 and 28 is fed to a system status board 64, as will be described in greater detail hereinafter.

The coded injection message from output contactor 28 is fed to the primary of an injection transformer 30 which performs two functions. Firstly, transformer 30 isolates the pulse code generator (consisting of rectifier 20 and inverter 24) from the power line 42. Transformer 30 also has its secondary connected to deliver the 340 Hertz alternating current signal to the injection inductors 32 and injection capacitors 34. Inductors 32 and capacitors 34 are tuned to provide a series circuit resonant at the desired pulse code frequency of 340 Hertz. Surge protection arc gaps 36 are connected across the injection inductors 32 and the transformer winding to the neutral to provide surge protection when the injection inductor 32 and capacitors 34 are connected to the substation bus 42. That is, a surge current can create an overvoltage on the inductors 32 and the arc gaps 36 are used to limit that voltage.

The substation injection unit runs with an isolated neutral; however, it is desirable to limit its relationship to the system neutral, and this function is performed by a neutral shift arc gap 38. That is, if the system neutral or the substation neutral shift too far with respect to one another, the neutral shift arc gap 38 will fire to hold them in a fixed voltage relationship.

From the inductors 32 and the capacitors 34, the 340 Hertz pulse code signal is applied through disconnect devices 40 which may be, for example, simple disconnect switches or a mechanized switch utilized to switch capacitor banks on and off the line. From there, the pulse code signal is applied to the substation bus 42 to be sent to the remote receiver units along the power lines.

The output from power output contactor 28 is also fed through current transformers 44 to a neutral shift detector 48 which acts to indicate when the power system neutral has shifted sufficiently to cause improper operation of the substation injection unit. Such a shift can be caused by, for example, a line-to-neutral or line-to-line fault which, if not cleared sufficiently rapidly, causes neutral shift detector 48 to function to disconnect the substation injection unit from the power line via system status board 64, control relay circuits 18, power breaker 14 and contactors 16 and 28.

Reference numeral 50 indicates generally the control logic for controlling the function and operation of the circuits described hereinabove in the substation injection unit. Single phase power is fed from terminal board 12 into a trip breaker 52 and then through an electromagnetic interference filter 54 which eliminates some of the transients and higher harmonics being supplied to a transformer 56. Transformer 56 steps down the voltage level to one usable by direct current power supply 58 which may be, for example, approximatly 120 volts. Power supply 58 supplies direct current power to the control and communications module 60.

When the substation injection unit is transmitting a pulse code signal through the substation bus 42, part of that signal is fed back through the customer's power supply 10 down through terminal board 12, trip breaker 52 and may be detected by a pulse detector 62. Pulse detector 62 preferably comprises a modified remote receiver unit which is designed to detect, on a pulse-by-pulse basis, the pulse code signal impressed upon the power lines. Pulse detector 62 is set forth in greater detail in copending U.S. application Ser. No. 53,252, filed June 29, 1979, assigned to the same assignee as the present invention, said application being expressly incorporated herein by reference. The output of pulse detector 62 is fed to the system status and I/O board 64 in the control and communications module 60. With respect to this information, system status board 64 is used to confirm that the ripple tone or pulse code signal is being applied to the system.

The heart of the control and communications module 60 is a microprocessor 66 which may, for example, comprise a Motorola 6800 chip. The microprocessor 66, which can be denoted as a communications controller, performs several functions. For example, the pulses from the pulse detector 62 are fed to microprocessor 66 through system status board 64 for counting, storing, and transmission back to the MCS for comparison with the desired injection message sent to the substation injection unit by the master control station. This information is transmitted via a modem 74 that is connected to the telephone lines that are connected to the modem in the master control station. The microprocessor 66 stores the pulses received from pulse detector 62, on a pulse-by-pulse basis, and then transmits the complete 40 pulse code message back to the master control station where verification is made.

Figure 7:
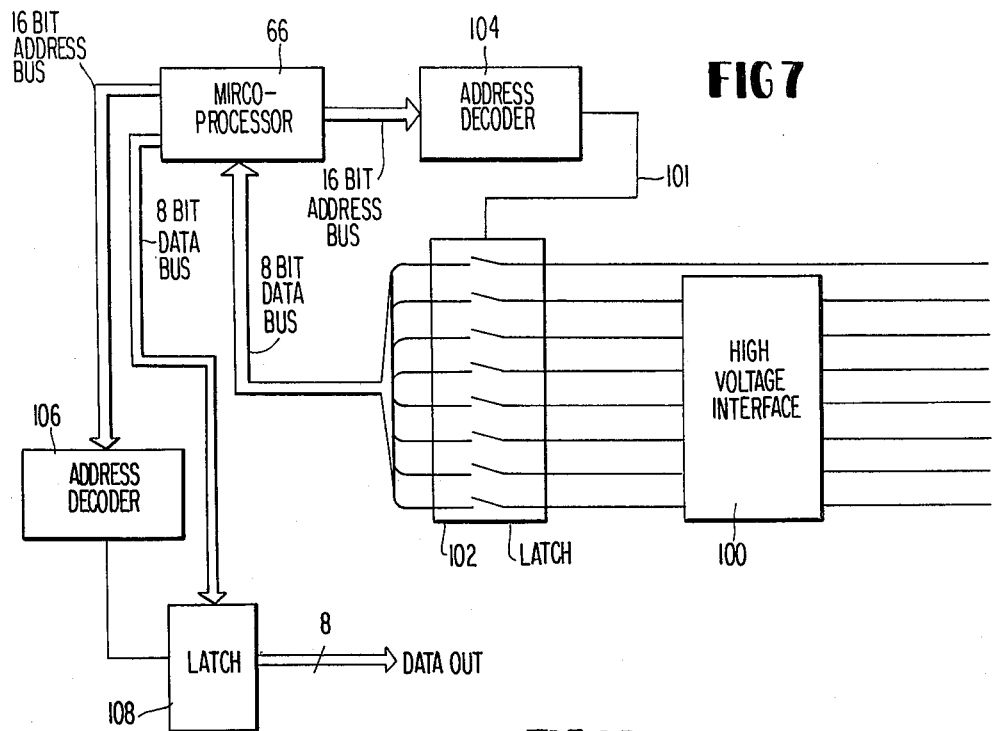
FIG. 7 is a block diagram illustrating certain components of a status and input/output board in the substation injection unit.

One function of the system status and I/O board 64 is to link and isolate the low level electronics portion of the control logic section 50 from the nominal higher voltage circuits in the substation injection unit. A block diagram of the system status and I/O board 64 is illustrated in FIG. 7 in combination with the microprocessor 66. The inputs to microprocessor 66 are received by the board 64 through a high voltage interface circuit 100 which converts the nominal 220 volt inputs to 5 volt logic level. In a preferred embodiment, seven such inputs are provided through high voltage interface 100. As explained above, one of the inputs is from pulse detector 62. A second input is from the neutral shift detector 48. Another pair of inputs are provided from two relays in control relay circuit 18, while yet another pair of inputs are provided from temperature detectors 24a to be described below. From the high voltage interface 100, the low level logic signals are fed to a latch 102 having a chip enable input 101. Chip enable input 101 to latch 102 is provided by an address decoder 104 which receives a 16 bit address signal from the microprocessor 66. When the right address is detected in decoder 104, the chip enable output 101 goes high to latch the data through latch 102 to be delivered to the input of the microprocessor 66 via an 8 bit data bus.

Outputs are transmitted from the microprocessor 66 in a similar fashion. That is, a 16 bit address bus feeds an address to an address decoder 106 which, upon detection of a proper address, causes a chip enable output 107 to go high to actuate latch 108 to receive the eight bits of data from microprocessor 66 to be sent to the desired output. For example, when it is desired to open or close the input contactors 16 and the output contactors 28, and appropriate address and data is sent from the microprocessor 66 through the output latch 108 to deliver the control signals to the control relay circuits 18.

Microprocessor 66 communicates with rectifier controller 68 and inverter controller 46 in a similar manner utilizing, of course, different address codes on its output address bus to address the particular controller desired.

Referring back to FIG. 6, it is seen that three-phase power is supplied to rectifier controller and gate generator 68 via line 69. The three-phase, 60 Hertz supply to rectifier controller 68 along with output voltage level commands from microprocessor 66 allows the controller 68 to establish a predetermined voltage level which must appear on the SCRs before they can be fired. This information provides a reference point for controlling the firing time of the SCRs of the rectifier. The firing time determines the level of output power. The master control station permits selection through microprocessor 66 of one of a plurality of desired output voltages for rectifier 20 which may comprise, for example, a high, medium and low voltage. The firing time that the SCRs in rectifier 20 are fired depends upon the selected output voltage level and is controlled by rectifier controller 68, in a manner to be described in greater detail hereinafter.

Reference numeral 24a indicates a pair of temperature rise detectors located in the inverter 24. One of the detectors is positioned adjacent the SCRs to detect an initial threshold of temperature. Upon reaching the initial threshold, a signal is transmitted to system status board 64 in control module 60 where it is transmitted back to the master control station through the microprocessor 66 to indicate that the maximum operating temperature of the substation injection unit has been reached. This permits corrective action to be taken at the master control station. The other temperature detector operates at a higher temperature threshold. When the high threshold is reached, a signal is sent directly to the control relay circuits 18 to operate the shunt trip via line 71 in power breaker 14 to immediately disable input contactor 16 and output contactor 28 to isolate the substation injection unit and render same incapable of further transmission. This signal is also transmitted through the control relay circuit 18 to the microprocessor 66 via line 65 and thereafter to the master control station to indicate an alarm condition. Line 65 consists of four lines between system status board 64 and control relay circuits 18. Control relay circuits 18 comprise a pair of relays to operate input and output power contactors 16 and 28, respectively. Further, the status of contactors 16 and 28 is periodically polled and reported to the master control station through system status board 64 and microprocessor 66.

A transformer 70 is connected to receive power from filter 64 and changes the line voltage to a desired level to operate a pulse gate power supply 72 which provides DC power for rectifier 20 and inverter 24.

Reference numeral 76 in control and communication module 60 refers to optional boards which may be provided in the substation injection unit to monitor analog or discrete data for feeding back system parameters to the master control station. For example, one analog input may be a direct current signal proportional to the system load which can be utilized in the load management system for the type 3 control lists. Alternatively, the demand information can be, for example, the inputs from kilowatt-hour meters where the input is dry contact closures on the lines which are attached to switch on the meters. The rate at which the switching operations occur are indicative of demand, and the total number of contact closures is proportional to the kilowatt-hours consumed. Referring to FIG. 8, meters A and B each have a pair of dry contact which close every time the meter turns to produce a pulse from the high voltage interfaces 140 and 150. The outputs from high voltage interfaces 140 and 150 are fed to a pair of timers which may be located, for example, in a timing chip 160 (such as Motorola's 6840). Timer 1 in the chip 160 is loaded with a number from microprocessor 66, which, for example, is equivalent to five minutes. A 60 Hertz clock signal causes timer 1 to decrement. At the end of five minutes, the microprocessor 66 reads the present count in timer 2 and subtracts it from the previous count, which is equal to the total number of pulses in that time interval which is loaded into a RAM location 170. The same operation is performed with timer 3. The numbers are fed to a stack of memory locations in RAM 170, and, when an hour has elapsed, and the master control station calls for an analog value, the microprocessor 66 sums everything in the two RAM stacks and sends it to the master control station which then calculates the demand per hour.

B. RECTIFIER CONTROLLER

Figure 9:
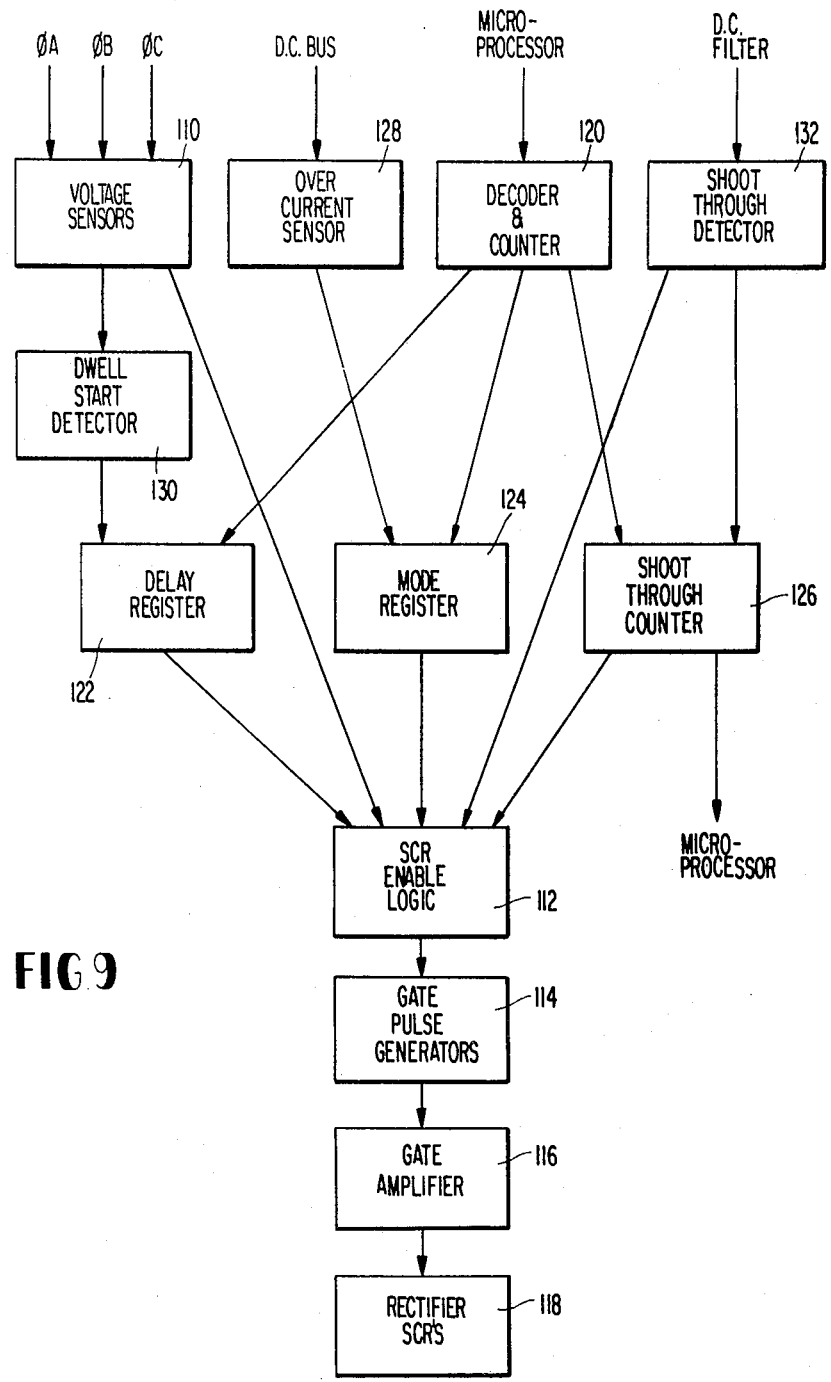
FIG. 9 is a block diagram of a rectifier controller of the substation injection unit.

There is shown in FIG. 9 a functional block diagram of the rectifier controller. Further details of the rectifier controller are set forth in copending U.S. application Ser. No. 54,025, filed July 2, 1979, assigned to the same assignee as the present invention, said application being expressly incorporated herein by reference. The rectifier controller utilizes voltage sensors 110 to detect the more positive voltages by comparing the instantaneous magnitude of phase voltages A, B and C from the three-phase power grid. The phases of the three voltages must be rotating positively from A to B to C. The voltage sensors 110 produce outputs whenever one line is positive with respect to another line with which it is compared. The voltage sensors are connected to the SCR enabling logic 112 in order to determine the firing order of the SCRs.

The same information required for determining the firing order is fed to a dwell start detector 130. The dwell start detector is responsive to the outputs of voltage sensors 110 to produce an output whenever any two of the three-phase voltages are equal.

A delay register 122 is responsive to the dwell start detector 130 output and to time delay information from a decoder and counter 120 which receives output voltage signals from the microprocessor. If the time delay received from decoder 120 is zero, then the delay register 122 will immediately enable logic 112. When this condition exists, the rectifier will produce a full power output. The reason for this is that, in this event, the SCR enabling logic 112 will be time controlled only by the voltage sensors 110 since there is no dwell time delay. As the length of the time delay increases from zero, the firing of the SCRs will be delayed by the output from delay register 122.

The decoder and counter 120 also provides an input to a mode register 124. This mode register 124 is responsive to a mode command from the microprocessor through decoder 120 to deliver an appropriate signal to SCR enabling logic that is used to initiate and terminate operation of the rectifier controller upon command from the microprocessor or when there are other rectifier controller malfunctions.

During normal operation, the rectifier controller operates in response to commands from the microprocessor which are received by the decoder and counter 120 and in response to the three-phase voltages which are sensed by the voltage sensors 110. The commands from the delay register 122, the voltage sensors 110, and the mode register 124 under normal operation will permit firing of the rectifier SCRs by enabling logic 112.

Connected to the output of the SCR enabling logic 112 are gate pulse generators 114 which are utilized to generate bursts of high frequency pulses which may be, for example, on the order of 50 kilohertz. These pulses are then applied to gate amplifiers 116 which are used to increase the power level and to drive the rectifier SCRs 118. The rectifier SCRs have isolation transformers associated with their gates. These isolation transformers use the 50 kilohertz gate pulse generators 114 to provide the necessary gate control signal.

The rectifier controller also has associated with it additional means for controlling the SCR enabling logic 112 which are responsive to conditions on the DC bus. These means are an overcurrent sensor 128 and a shoot-through detector 132.

The overcurrent sensor 128 is placed in the direct current bus and senses a high direct current for sustained periods of time. This sensor may be, for example, a thermally responsive switch which closes to apply a signal to the mode control register 124 which will produce a disabling signal which is received by the SCR enabling logic 112.

In order to provide for rapid control of the rectifier direct current output voltage when a shoot-through occurs in the SCRs associated with the inverter circuitry, there is provided a shoot-through detector 132. A "shoot-through" is the undesirable condition which may occur in the inverter circuit when two series connected SCRs operating on the same voltage phase are simultaneously placed in conduction which produces a short circuit on the direct current bus. The shoot-through detector 132 responds to this short circuit condition on the direct current bus and produces a signal responsive to the short circuit condition. The shoot-through detector 132 is connected to the SCR enabling logic 112. When such a shoot-through condition is sensed, the SCR enabling logic 112 immediately disables the rectifier SCR gates, and thereby prevents any further power from being applied to the direct current bus during the period of the shoot-through condition. The SCR enabling logic 112 maintains the gates in their "off" condition for a predetermined period of time. This provides time for the inverter to recover from its undesirable shoot-through condition.

Shoot-through conditions may occur randomly in inverter circuits. The shoot-through detector 132 and the SCR enabling logic 112 permit the rectifier to be protected against damage from such random conditions. If the shoot-through condition becomes persistent and repetitive, there may be a serious fault associated with the inverter circuit's rectifiers. In order to determine if such serious and continuous shoot-through conditions are present, there is provided a shoot-through counter 126. The shoot-through counter 126 counts the number of shoot-through detections within a given time interval. When a predetermined number of shoot-throughs is detected within the predetermined period, the shoot-through counter 126 produces a shut down signal which is received by SCR enabling logic 112. The SCR enabling logic 112 will then permanently shut down the SCR gates until a microprocessor-initiated or manually initiated command is received to clear the fault and restart the rectifier. The shoot-through counter 126 also provides fault data supplied to the microprocessor which is used to control the rectifier controller as well as the inverter.

C. INVERTER CONTROLLER

Figure 10:
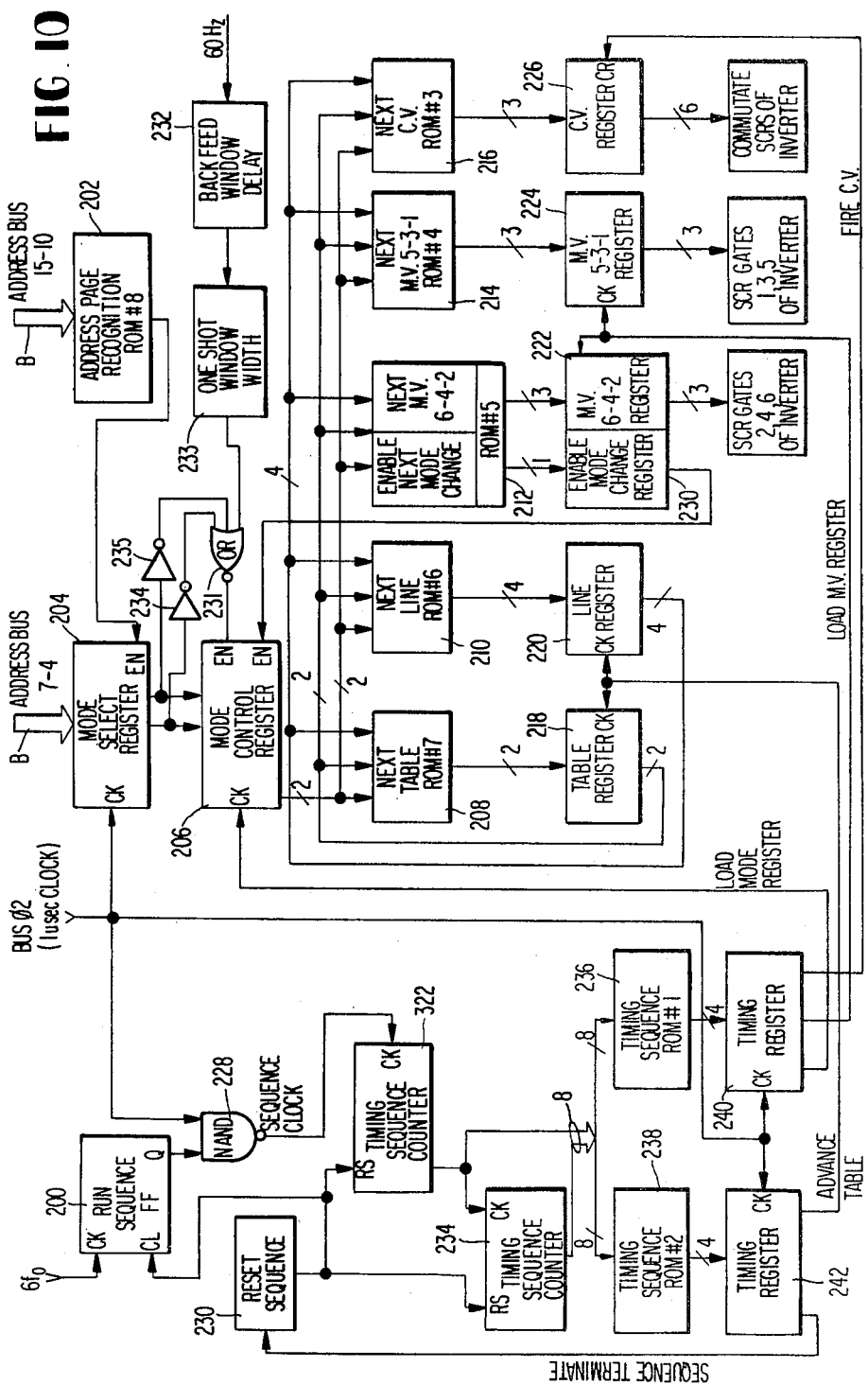
FIG. 10 is a block diagram of an inverter controller of the substation injection unit.

Referring to FIG. 10, information pertaining to the desired mode of operator of the inverter is received from the substation injection unit microprocessor along an address bus B by an address page recognition ROM 202 and a mode select register 204. The mode select register 204 provides a two bit output which represents one of the four possible modes of operation of the inverter. The four modes of operation are CRASH (output 00), OFF (output 01), IDLE (output 10), and INJECT (output 11). In the CRASH mode, the inverter SCRs are shut down in response to detection of a fault condition. In OFF, the SCRs are all turned off momentarily. The IDLE mode corresponds to the absence of a pulse in the pulse code signal that forms the injection message, while the INJECT mode corresponds to the presence of a pulse in the pulse code signal.

The initial timing of the inverter controller output signals is achieved through a mode control register 206. The mode control register 206 is clocked by a timing signal referred to as the load mode register signal received from a timing register 240, and is enabled by signals from an enable mode change register 230, to be explained more fully below. A second enabling input is applied to mode control register 206 from an OR gate 231 which is responsive to a back feed 60 Hertz signal obtained either from the power lines or from the rectifier controller of the substation injection unit, as will be explained in greater detail hereinafter.

Upon receipt of the two enabling inputs and the load mode register signal, mode control register 206 receives the two bit code from the mode select register 204 and delivers same to its two line output which forms a portion of an address for an eight bit address bus that feeds a plurality of read-only-memories (ROMs) 208, 210, 212, 214 and 216.

ROMs 208 through 216 can be denoted as a next table ROM 208, a next line ROM 210, enable next mode change and next main SCR ROMs 212 and 214 and a next commutate SCR ROM 216.

Associated respectively with each of the ROMs 208 through 216 are output registers 218, 220, 222, 224 and 226 which can be denoted as a table register 218, a line register 220, main SCR registers 222 and 224 and commutate SCR register 226. An enable mode change register 230 is also connected to receive an output from ROM 212.

The addresses for next table ROM 208, next line ROM 210, enable next mode change and next main SCR ROM 212, next main valve ROM 214 and next commutate SCR ROM 216 are generated in response to the initial two bit address from the mode control register 206, and further in response to timing signals received from timing registers 240 and 242. The address bus for providing information to the ROMs 208 through 216 includes eight bits of address. Two of the eight address bits are supplied by the mode control register 206. The remaining six bits are generated by next table and next line ROMs 208 and 210. The registers 218 and 220 receive the information from ROMs 208 and 210 when they are clocked by advance table signals which are generated by timing register 242. The information in next table ROM 208 is the next table information and comprises two of the address bits which are applied to all of the ROMs 208, 210, 212, 214 and 216. The ROM 210 contains the next line address information in the form of the remaining four bits for the address bus.

The eight bit address to ROMs 208, 210, 212, 214 and 216 consists of the information on two lines from the mode control register 206, the information on two lines from table register 218, and the information on four lines which come from the line register 220. The address on the address bus is changed when a first timing signal, the advance table signal, is received from timing register 242. The advance table signal is applied to the clock terminals of table register 218 and line register 220. When these registers are clocked, the next table information from ROM 208 and the next line information from ROM 210 will be latched in and set as the table and line information for six of the eight bits of the address bus. As the address bus information changes, the output of next table ROM 208 and next line ROM 210 will advance to the next address of the ROMs which contains information at the location addressed by the address bus pertaining to the next desired address. In this manner, whenever the clock terminals of the table register 218 and the line register 220 are clocked, the address on the eight bit address bus will change to the next desired address. It is through the continuous clocking of the table register 218 and the line register 220 that the address information from ROMs 208, 210, 212, 214 and 216 is continuously changed for cycling the firing control information for the inverter valves.

The ROMs 212, 214 and 216 with their associated output registers 222, 224 and 226 operate in a similar manner. The information appearing on the outputs of ROMs 212, 214 and 216 is the next-to-be-used firing information for the main SCRs and commutate SCRs of the inverter.

When the next main SCR ROM 212 is addressed, there appears on its output bus three bits for indicating the next desired firing state of inverter SCRs 6, 4 and 2. Similarly, when the next main SCR ROM 214 is addressed, it produces on its output three bits for indicating the next desired firing state for inverter SCRs 5, 3 and 1.

The main SCR register 222 receives the three bits of information from next main SCR ROM 212 when a timing signal is received on the load main SCR register line which is generated by timing register 240. Similarly, the main SCR register 224 which controls SCRs 5, 3 and 1 is also clocked by the load main SCR register timing signal from controller timing register 240.

All of the commutate SCR firing controls are generated by next commutate SCR ROM 216 which also responds to the address bus information. Next commutate SCR ROM 216 has as outputs three bits which are received by commutate SCR register 226. The commutate SCR register 226 preferably comprises a 3 by 8 decoder for decoding the three bit output from next commutate SCR ROM 216 to create six commutate SCR firing signals (only six of the eight output bits are used). The commutate SCR register 226 has as a clock input the fire commutate SCR timing signal which is received from timing register 240.

In order to clock the mode control register 206, the table register 218, the line register 220, the main SCR register 222, the main SCR register 224, and the commutate SCR register 226, it is necessary to generate timing signals which are appropriately spaced in time to control the desired sequence of events. The timing of the events determines the output frequency of the inverter.

The apparatus for generating the necessary timing signals is also shown in FIG. 10. A 6fo signal (where fo=the desired pulse code frequency) is applied to the clock input of a run sequence flip-flop 200. The run sequence flip-flop 200 is triggered on the positive zero-crossing of the 6fo signal and produces an output to a sequence clock in the form of a NAND gate 228. The other input to NAND gate 228 is a one microsecond clock pulse. The output of NAND gate 228 is a sequence clock signal which is a burst of one microsecond clock pulses for a period of time determined by the run sequence flip-flop 200. The output of NAND gate 228 is fed to a timing sequence counter 232 at its clock terminal. The timing sequence counter 232 and a companion timing sequence counter 234 count the one microsecond clock pulses within the run sequence which are received from NAND gate 228. The output of timing sequence counters 232 and 234 is an eight bit address code which is used to address a timing sequence ROM 236 and a timing sequence ROM 238.

As signals are generated by the timing sequence counters 232 and 234, the data in the memory addresses of the timing sequence ROMs 236 and 238 are read out, one address each microsecond. The address code from the timing sequence counters 232 and 234 changes upon each clock input received from the NAND gate or sequence clock 228.

The data outputs from the timing sequence ROMs 236 and 238 are fed respectively to timing registers 240 and 242. There are four bits of data fed from timing sequence ROM 236 to timing register 240 and four bits from timing sequence ROM 238 to timing register 242. The clock signal for timing registers 240 and 242 comprises the one microsecond clock input. The outputs of the timing registers 240 and 242 are precisely timed pulses in accordance with the one microsecond clock, and in accordance with the timing sequence ROM address chosen by the timing sequence counters 232 and 234.

One output from the timing register 242 comprises a sequence terminate signal. The sequence terminate signal is applied to a reset sequence circuit 230 which preferably comprises a one-shot flip-flop. The output of the one-shot 230 is then applied to reset the timing sequence counters 232 and 234, and also to clear the run sequence flip-flop 200. The application of this pulse to the run sequence flip-flop 200 terminates the sequence until the next positive going 6fo signal is observed.

The five timing signals from the timing registers 240 and 242 are denoted the load mode register signal, the load main SCRs register signal, the advance table signal, the fire commutate SCR signal, and the sequence terminate signal, and are all controlled by the information loaded in the timing sequence ROMs 236 and 238. Only five of the eight potential output lines from ROMs 236 and 238 contain information which is used in the run sequence. These five lines are used to advance the table and line, load the main SCR registers, first the commutator SCRs, load the mode register, and to terminate the sequence.

The termination of the sequence occurs after about 73 microseconds which is a relatively short period of time when compared to the time required for completion of one 6fo cycle. In the preferred embodiment, the pulse code output frequency fo is 340 Hertz. Therefore, the 6fo frequency is 2,040 Hertz. The time for one 6fo cycle is therefore approximately 490 microseconds. It therefore can be seen that the complete timing sequence occurs during the initial 73 microsecond portion of each 6fo signal. The outputs on the various timing lines to the inverter controller registers do not change until the next 6fo cycle is initiated over 400 microseconds later.

The load mode register timing signal is generated by timing register 240, and is applied to the mode control register 206 as the last pulse of the series of timing sequence pulses which control the cycling of the inverter controller. It is through this pulse that a new address is applied to ROMs 208 through 216 in response to a mode change address received by the mode select register 204. The load mode register clock pulse is the final timing pulse of the timing sequence. Therefore, a change in the information in the mode control register 206 will not effect the firing of the SCRs of the inverter until the next 6fo interval begins, and the next advance table timing signal is output from timing sequence ROM 238.

The enable mode change register 230 is responsive to the enable next mode change portion of the next main SCR ROM 212. The enable next mode change output is a one bit output which occurs at the end of each 6fo interval. The enable mode change register 230 is responsive to the load main SCR register timing signal from timing register 240 as is the main SCR register portion of register 222. The output of the enable mode change register 230 is then fed to the mode control register 206 to enable the mode control register at the end of each 6fo interval, or at the end of each 340 Hertz signal.

At the beginning of the INJECT mode, it is necessary to inject the pulse code signal at the proper point in the 60 Hertz voltage of the substation bus to prevent injection transformer saturation. This point is determined experimentally and is set by adjustment of the back feed window delay circuit 232.

The second enabling input for the mode control register 206 is received from the back feed window delay circuit 232 which receives the 60 Hertz signal representative of the line voltage. A back feed window delay circuit 232 and a one-shot window width circuit 233 provide one of the three inputs to an OR gate 231.

The two bit output from mode select register 204 is connected to inverters 234 and 235 so that the output of inverters 234 and 235 is a logical "0" when the mode select register outputs a signal representing the INJECT mode, which is a "11" input to the inverters 234 and 235. The OR gate 231 acts as a disabling gate for the mode control register 206. When the input to the OR gate 231 is "0" on all three lines, the output of the OR gate 231 will be a logical "1", which disables the mode control register 206. At all other times, when a "1" appears on any one of the three input lines to OR gate 231, the output of OR gate 231 will enable the mode control register 206. In this manner, the only possible time that the mode control register is disabled is during the INJECT mode when the output of inverters 234 and 235 are logical "0"s.

The back feed window delay circuit 232 has as an input a point on the 60 Hertz three-phase lines. The back feed window delay 232 is a one-shot with an adjustable time constant which will delay its output a predetermined period of time which is selectable in accordance with equipment operation. The back feed window delay may be on the order of, for example, one to five milliseconds. The delayed output from the back feed window delay 232 is then fed to a one-shot flip-flop 233 which has a predetermied width or time which is slightly greater than the time required for one 340 Hertz cycle. This time may be set to, for example, four milliseconds. The output of the one-shot 233 will be a logical "0" until the window from circuit 232 is seen. When the window is present, the one-shot 233 output will be a logical "1" which will allow the mode control register 206 to be enabled. When the output of the one-shot 233 is a "0" during INJECT, the mode control register 206 will be disabled by virtue of the fact that there are three "0"s on the inputs to OR gate 231.

The width of the window or the time period of four milliseconds for the one-shot 233 must be greater than the time interval between one enable mode change command from register 230 and the next. Since the enable mode change commands from register 230 occur only once in each 340 Hertz cycle, then the time period for the one-shot 233 must be slightly greater than the time for one 340 Hertz cycle.

Outputs of main SCR registers 222 and 224 are each connected to a gate pulse generator (not shown) which may each comprise, for example, 50 kilohertz oscillators. The outputs from the gate pulse generators are then applied to gate amplifiers or integrated circuit drivers (not shown). The outputs from the gate amplifiers are then applied to the inputs of the main SCR inverter SCRs through isolation transformers.

The commutate SCR register 226 has as an input one microsecond timing signals which are generated when the fire commutate SCR signal from timing register 240 clocks commutate SCR register 226. Since the output from register 226 output is at a high frequency, it is not necessary to utilize a 50 kilohertz oscillator as was used in the driving circuitry for the main SCR SCRs. Therefore, the outputs of commutate SCR register 226 are fed directly through transistor amplifiers and isolation transformers to the gates of the commutating SCRs of the inverter.

Further details of the inverter controller 46 are set forth in copending U.S. application Ser. No. 54,024, filed July 2, 1979, assigned to the same assignee as the present invention, said application being expressly incorporated herein by reference.

D. SUBSTATION INJECTION UNIT SOFTWARE

Figure 13B:
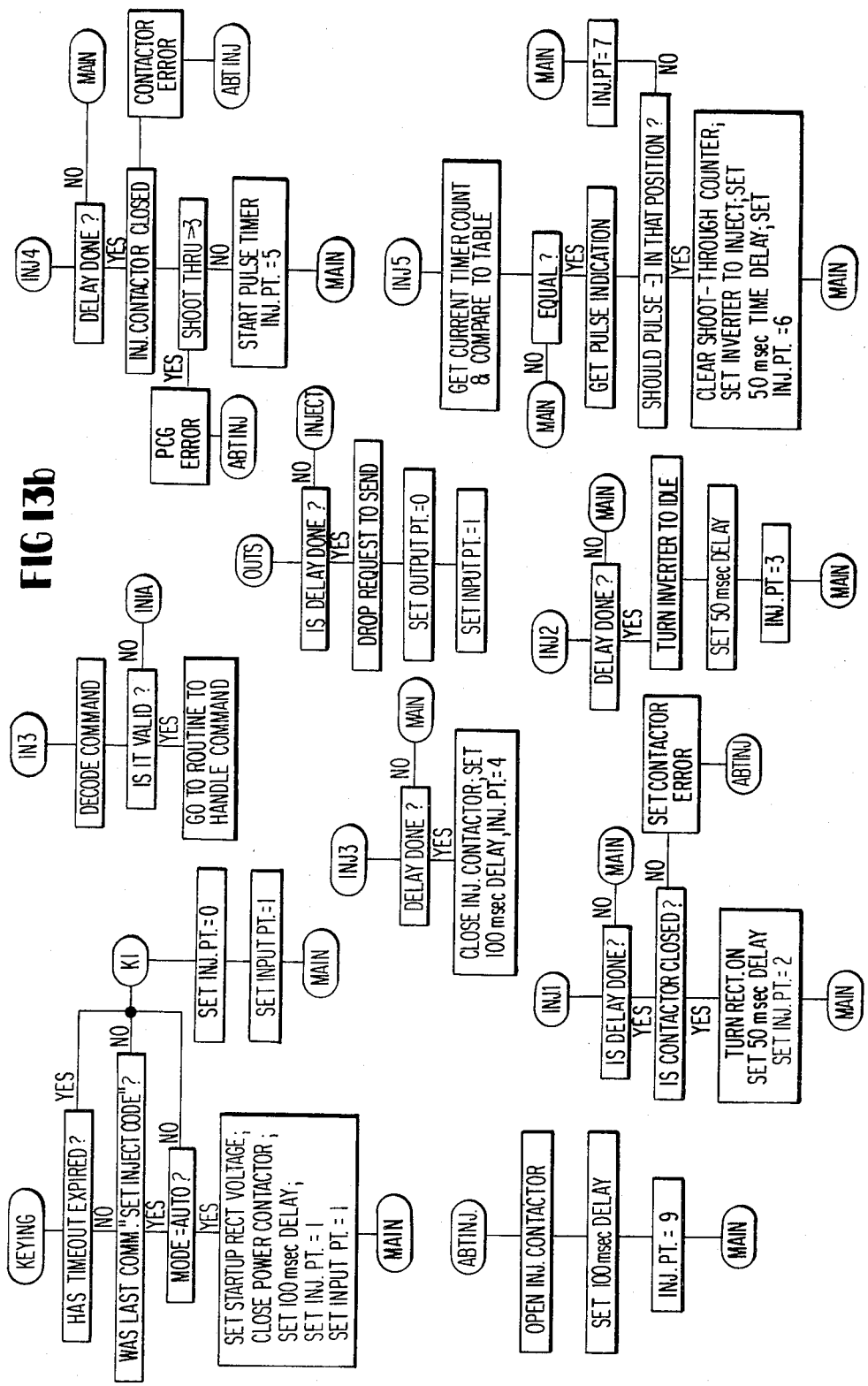
Figure 13D:
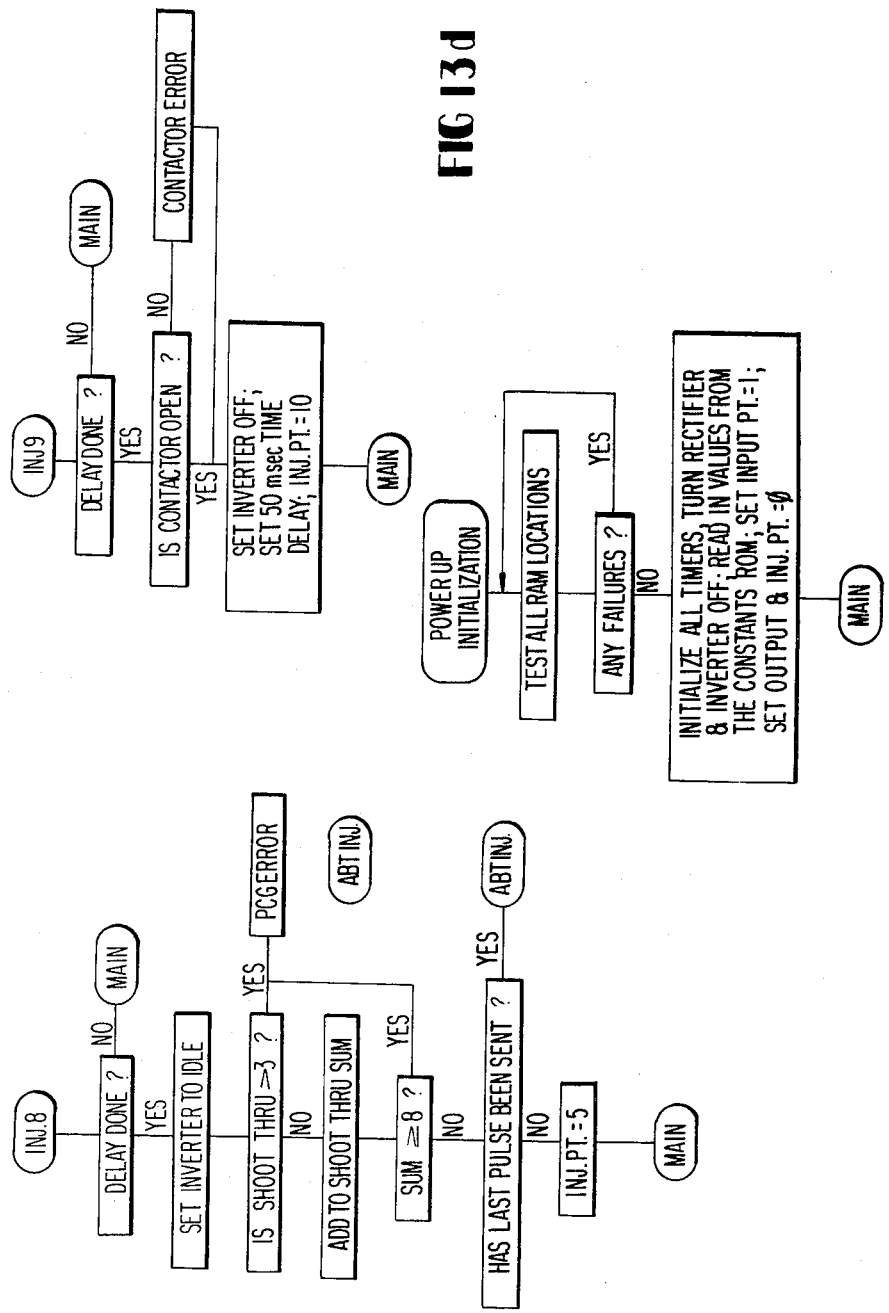

FIG. 13 illustrates the flow chart of the software program for the microprocessor 66 located in each substation injection unit. The program includes three major routines, each of which is broken into smaller parts to maximize the efficiency of the microprocessor. The three major routines are the INPUT routine where communications are being received at the substation injection unit, the OUTPUT routine where the substation injection unit is outputting information to the master control station, and the INJECT routine where the substation injection unit is involved in injecting the selected pulse code signal onto the substation's power lines. The INPUT and OUTPUT routines each take approximately 440 milliseconds to run, while the INJECT routine runs for approximately 90 seconds. The INPUT routine is broken into three routines designated as IN-1, IN-2 and IN-3, the OUTPUT routine is broken into five routines designated as OUT-1, OUT-2, OUT-3, OUT-4 and OUT-5, while the INJECT routine is broken into eleven routines designated as INJ-1 through INJ-11. Three internal pointers, one for the input, one for the output and one for the injection routines, are set by various steps in the routines in order to loop to other routines in proper sequence. The pointers utilized may be summarized as follows:

| INPUT POINTER | OUTPUT |
| --- | --- |
| 0 | OUTPUT |
| 1 | IN-1 |
| 2 | IN-2 |
| 3 | IN-3 |
| OUTPUT POINTER | |
| 0 | INJECT |
| 1 | OUT-1 |
| 2 | OUT-2 |
| 3 | OUT-3 |
| 4 | OUT-4 |
| 5 | OUT-5 |

-continued

| INJECTION POINTER | |
|---|---|
| 0 | MAIN |
| 1 | INJ-1 |
| 2 | INJ-2 |
| 3 | INJ-3 |
| 4 | INJ-4 |
| 5 | INJ-5 |
| 6 | INJ-6 |
| 7 | INJ-7 |
| 8 | INJ-8 |
| 9 | INJ-9 |
| 10 | INJ-10 |
| 11 | INJ-11 |

Each substation injection unit is provided with a manually operable switch having three positions: off, auto and manual. In the auto position, it indicates that the substation injection unit is communicating with the master control station and will inject whatever injection message is received and verified by the master. In the manual position, it indicates that the substation injection unit will communicate with the master, but will not automatically inject.

In the POWER UP initialization routine, all of the RAM locations are tested to see if there are any failures. If not, the timers are initialized, the rectifier and inverter are both turned off, values are read in from the CONSTANTS ROM, the input pointer is set equal to 1 to ready the substation injection unit for receiving an input message, and the output and injection pointers are set equal to zero.

The MAIN routine initially sets a watchdog timer which makes sure that the software program starts from the beginning. After testing to make sure the mode switch is either in auto or manual, the program receives the input pointer and goes to the proper subroutine established by the pointer. In a similar fashion, the INJECT and OUTPUT routines obtain the injection and output pointers, respectively, and then loop to the routine established by the respective pointers.

Referring first to routine IN-1, it first looks to see if a carrier detect flag has been received. The carrier detect flag is a signal from the modem of the substation injection unit which indicates that the master control station is trying to communicate with the substation injection unit. If the carrier detect is up, the routine looks to see if a character has been received. If so, it then checks to to see if there is a framing, parity or overrun error. If not, the routine checks to see if the character is an STX which would indicate the beginning of a transmission from the master control station. If so, a buffer is initialized and the input pointer is set to number 2.

Routine IN-2 first checks to see if a carrier detect is still up, and then to see if a character has been received and if there are any errors in the character. If the carrier detect is not up or there is an error detected, the routine goes to routine IN-1A, which is an abort input routine wherein the input pointer is set to number 1 and the program then loops to the INJECT routine. If there is no error, the character is saved in the buffer until it is full. Then the last character is checked to see if it is an ETX to denote the end of the message from the master control station. If so, the routine then checks to see if this particular message is directed to this particular substation injection unit. If it is not, the routine looks to see if it is a commence keying command which is directed to all substation injection units and, if it is, it directs the program to the KEYING routine. If the message is directed to this particular substation injection unit, the input pointer is set to number 3.

In routine IN-3, the command is decoded and is checked to see if it valid. If it is, the program loops to the proper routine to handle the decoded command.

The OUTPUT routines are similar. Routine OUT-1 first checks to see if a carrier detect is up, and, if it is, the program loops to the INJECT routine. If it is not, the routine raises a request to send flag, which is a signal to its modem that it desires to communicate with the master control station. The output pointer is then set to number 2.

In routine OUT-2, the substation injection unit checks to see if a clear-to-send flag is up, which is a response from its modem that the lines are clear for communication to the master control station. When this flag is received, a timer is set for a 250 millisecond delay, and the output pointer is set to number 3.

In routine OUT-3, the 250 millisecond delay is checked to see if it is over, and, if it is, a piece of hardware known as the ACIA (Asynchronous Communication Interface Adapter) is checked to see if it is ready for a character. If it is, a character is output, and, if all characters have not been sent, the program loops back to OUT-4 to repeat the outputting of a character. After all characters have been output, a 30 millisecond delay is set and the output pointer is set to number 5.

In routine OUT-5, the 30 millisecond delay is checked to see if it is finished, and, if it is, the request to send flag is dropped, the output pointer is set equal to zero and the input pointer is set equal to one. The last two settings cycle the program back to the INPUT routines.

Prior to injection of a pulse code signal, a commence keying command must have been received during INPUT routine IN-2. At that point, the program loops to the KEYING routine which first checks to see if the previously set timeout has expired. The timeout control is a preselected time period, for example, 20 seconds, after which a commence keying command will no longer be valid to commence keying of a previously set up and verified injection message. If the timeout has expired, the program loops to routine K1 where the injection pointer is set equal to zero, the input pointer is set equal to 1, and the program loops to MAIN.

If the timeout has not expired, the KEYING routine checks to see if the last command sent was a "set injection code" command. If not, the program loops back to MAIN. If the last command was a "set injection code", the program checks to see if the mode switch is in auto and, upon determining that it is, the start up rectifier voltage is set, the power contactors are closed, and a 100 millisecond delay is established. The injection pointer is set to 1, which indicates that the substation injection unit is ready for an injection, and the input pointer is also set to one.

The eleven INJECT routines will now be explained. In INJ-1, the program first determines whether the delay set has timed out; if it has, it checks to see if the contactor is closed. If the contactors are not closed, a contactor error is set and the routine loops to ARTINJ, or abort injection. In routine ABTINJ, the contactors are opened, a 100 millisecond delay is established, the injection pointer is set equal to 9, and the program loops back to MAIN.

If the contactor is closed, INJ-1 then turns on the rectifier, sets a 50 millisecond delay, and sets the injection pointer equal to 2.

The INJ-2, if the 50 millisecond delay is finished, the inverter is turned to its IDLE mode, whereafter a 50 millisecond delay is established and the injection pointer is set equal to 3.

When this 50 millisecond delay is finished, INJ-3 closes the injection contactors, sets a 100 millisecond delay, and sets the injection pointer equal to 4.

When this delay is finished, INJ-4 checks to see if the injection contactor has closed. If it has, it checks the shoot-through counter to see if it has counted more than three shoot-throughs for this particular pulse. If so, a pulse code generator error is set and the injection is aborted. If not, a pulse timer is started and the injection pointer is set to 5.

In INJ-5, a timer count is obtained from a counter which is being decremented by a 60 Hertz clock. A table of numbers are stored that correspond to time and indicates when each of the 41 pulses in the pulse code should be sent. The first step in INJ-5 is to check to see whether the current timer count is proper by comparing it with the table count. If it is, the pulse indication is obtained from an internal buffer set up by a set injection code message in the substation injection unit and is checked to see if there should be a pulse in that position. If there should not, the injection pointer is set to 7 and the program cycles to MAIN. If there should in fact be a pulse in the position indicated, the shoot-through counter is cleared, the inverter is set to INJECT whereupon generation of a 340 Hertz pulse is initiated. A 50 millisecond delay is then set, and the injection point is set equal to 6.

In routine INJ-6, if the 50 millisecond delay has expired, the power level from the rectifier is changed to its preselected or full value. This is achieved through the rectifier controller, as explained above. Therefore, when the inverter controller initially goes to INJECT in INJ-5, it provides a low voltage level on the output of the rectifiers, after which in INJ-6 the output voltage of the rectifier is raised to its nominal desired value. This is known as a "soft start". The injection pointer is then set to 7.

In routine INJ-7, the program first looks to see if the pulse has been completed. If it has, the information obtained from the special receiver or pulse generator is examined to see if there was or was not a pulse. The output of the rectifier is then set back to the minimum power level, a 50 millisecond delay is set, and the injection pointer is set equal to 8.

If the delay is finished in INJ-8, the inverter is set to IDLE which stops the injection of the 340 Hertz pulse. The routine then checks to see if the shoot-through counter is greater than three for this particular phase. If it is, a pulse code generator error is set and the injection is aborted. If it is not, the contents of the shoot-through counter is added to the previous count, and the total is checked to see if it is greater than or equal to 8. This loop allows three shoot-throughs per pulse and a total of eight shoot-throughs on all pulses output during a single injection. The program then checks to see if the last pulse in the train has been sent. If it has, this injection cycle is over and the program loops to the abort injection routine ABTINJ. If the last pulse has not been sent, the injection pointer is set to 5 to check the next pulse.

Routine INJ-9 comes into play when an injection is aborted under the ABTINJ routine. The INJ-9 routine first checks to see if the 100 millisecond delay has expired. If it has, it checks to see if the contactor has been opened as requested in the ABTINJ routine. If it has not been opened, a contactor error is indicated. In any event, the inverter is turned to its OFF mode, a 50 millisecond time delay is set, and the injection pointer is set to 10.

In routine INJ-10, when the 50 millisecond time delay has expired, the power contactor in the main breaker is opened, another 100 millisecond time delay is set, and the injection pointer is set to 11.

In INJ-11, after the 100 millisecond delay has expired, the program checks to see if the power contactor has in fact opened. If it has not, contactor error is indicated. In any event, the injection pointer is then set to zero and the program loops back to MAIN.

Recall that in routine IN-3, the decoded command, after validation, is enabled by going to the routine that handles the particular command. These commands can include a polling command, a set injection code command or a report injection code command.

If a polling command is is decoded, the master control station has requested certain information from the substation injection unit. Several conditions are checked in the routine POLLING COMMAND. Upon detection of a positive condition, a flag or bit is set to indicate the detected condition. As is apparent from the flow chart, the following conditions are checked: whether the substation injection unit mode switch is in its manual position; whether any SCRs are overtemperature; whether the cabinet is overtemperature; whether there is neutral shift error; whether there is a contactor error; and whether there is a pulse code generator error. After the status conditions are checked, and the appropriate flags or bits are set, the routine starts an analog conversion, inputs any new analog values, obtains the external discrete inputs, and generates a polling response, then looping to the message transmit or MESXMT routine.

In the MESXMT routine, the substation injection address is set, the output pointer is set equal to one, and the input pointer is set equal to zero, whereupon the substation injection unit is ready to transmit to the master control station.

If the decoded command is to set the injection code, the program loops to the SET INJECTION CODE routine. The injection code received from the master control station is saved in a buffer. Next, a response message is generated using the received injection code, and a one minute timeout is set. The program then loops to MESXMT to transmit the message back to the master control station for verification.

If the decoded command is to report the injection code, the program loops to the REPORT INJECTION CODE routine. First, the injection code read from the special substation injection unit receiver or pulse generator is obtained, and a response message is generated. The program then loops to MESXMT to transmit the message back to the master control station.

Obviously, numerous modifications and variations of the present invention are possible in light of the above teachings. It is therefore to be understood that, within the scope of the appended claims, the invention may be practiced otherwise than as specifically described herein.

What is claimed is:

1. A method for regulating a plurality of loads connected by power lines of an electric power utility to a remote utility station, said utility station having an electronic digital computer for controlling communications to the loads, said loads being classified into load control groups, each of said groups being responsive to at least one of a plurality of group control command signals for causing the loads in the respective group to be turned on or off, which comprises the steps of:
- (a) storing in the computer at the station preselected first, second and third types of control lists, each of said lists including at least one group control command;
- (b) selecting one of said control lists for activation and then executing the respective group control commands in the selected list as follows:
  - (i) upon selecting said first type of control list, executing each group control command therein only once;
  - (ii) upon selecting said second or said third type of control lists, executing each group control command therein repetitively;
- (c) generating a group control command signal in response to the execution of each of said group control commands;
- (d) transmitting said group control command signal through said power lines to said loads to effect turning on or off of said loads; and
- (e) periodically adjusting the duty cycle of the loads in those of said load control groups appearing on said third type of control list in accordance with the power demand on said utility, wherein said step of periodically adjusting includes the steps of:
  - (i) selecting the maximum off interval MO per time cycle and the minimum off interval per time cycle desired for loads in each of said groups classified in said third type of control list;
  - (ii) monitoring the total power demand X on said utility;
  - (iii) selecting a minimum value AV and a maximum value MV for the total power demand which correspond respectively to said minimum and maximum off intervals; and
  - (iv) adjusting the actual off interval Y of said loads according to the following formula:

$$Y=(MO)((X-AV)/(MV-AV)).$$

2. The method of claim 1, further comprising the step of prioritizing the transmission of the group control command signals to said loads in accordance with the priority of the corresponding control list from which the command signal was generated.

3. The method of claim 1, further comprising the step of recording the group control commands on an archival tape module at the station for recordkeeping purposes.

4. The method of claim 1, further comprising, prior to the step of executing the respective group control commands, the step of checking to see whether the selected control list has been preapproved to run on that particular day at that particular time.

5. The method of claim 1, further comprising, prior to the step of transmitting said group control command signal, the step of eliminating any duplicate group control command signals by:
identifying the oldest group control command signal; and
combining the oldest group control command signal with like group control command signals.

* * * * *

UNITED STATES PATENT AND TRADEMARK OFFICE
CERTIFICATE OF CORRECTION

PATENT NO. : 4,348,668

DATED : September 7, 1982

INVENTOR(S) : George P. Gurr et al

It is certified that error appears in the above-identified patent and that said Letters Patent are hereby corrected as shown below:

Column 5, line 29, insert -- be -- between "may" and "established".

Column 6, line 1, "from" should read -- for --.

Column 8, line 25, "preferrable" should read -- preferably --.

Column 8, line 64, insert -- is -- between "MCS" and "illustrated".

Column 14, line 51, "areas" should read -- area --.

Column 18, line 22, "to" should read -- is --.

Column 22, line 53, "and" should read -- an -- in the first instance.

Column 23, line 38, "64" should read -- 54 --.

Column 23, line 56, "contact" should read -- contacts --.

Column 25, line 62, "operator" should read -- operation --.

Column 26, line 41, "valve" should read -- SCR --.

Column 27, line 16, "valves" should read -- SCRs --.

Column 28, line 1, "232" should read -- 322 --.

Column 28, line 2, "232" should read -- 322 --.

UNITED STATES PATENT AND TRADEMARK OFFICE
CERTIFICATE OF CORRECTION

PATENT NO. : 4,348,668

DATED : September 7, 1982

INVENTOR(S) : George P. Gurr et al

It is certified that error appears in the above-identified patent and that said Letters Patent are hereby corrected as shown below:

Column 28, line 6, "232" should read -- 322 --.

Column 28, line 10, "232" should read -- 322 --.

Column 28, line 13, "232" should read -- 322 --.

Column 28, line 26, "232" should read -- 322 --.

Column 28, line 33, "232" should read -- 322 --.

Column 28, line 46, "first" should read -- fire --.

Column 32, line 61, "ARTINJ" should read -- ABTINJ --.

Column 33, line 1, "The" should read -- In --.

Column 33, line 30, "point" should read -- pointer --.

Column 34, line 20, delete "is" in the first instance.

Claim 1, column 36, line 10, "Y=(MO)((X-AV)/(MV-AV)" should read -- Y=(MO)((X-AV)/(MV-AV)) --.

UNITED STATES PATENT AND TRADEMARK OFFICE
CERTIFICATE OF CORRECTION

PATENT NO. : 4,348,668
DATED : September 7, 1982
INVENTOR(S) : George P. Gurr et al It is certified that error appears in the above-identified patent and that said Letters Patent are hereby corrected as shown below:

In the Drawing Figures:

Fig. 7, the line between Address Decoder 106 and Latch 108 should be labeled -- 107 --.

Fig. 10, "V." should read -- SCR -- in all instances.

Fig. 12A, Initialization Module "400" should be labeled -- 414 --.

Fig. 13a, in the IN-1A flowchart "OUTPUT POINTER" should read -- INPUT POINTER --.

Fig. 13b, "OUTS" should read -- OUT 5 --.

Fig. 13c, in the Polling Command flowchart "MESXMIT" should read -- MESXMT --.

Signed and Sealed this

Eleventh Day of January 1983

[SEAL]

Attest:

Attesting Officer

GERALD J. MOSSINGHOFF

Commissioner of Patents and Trademarks